US009747240B2

(12) United States Patent
Borikar

(10) Patent No.: US 9,747,240 B2
(45) Date of Patent: Aug. 29, 2017

(54) DYNAMIC CONNECTION OF PCIE DEVICES AND FUNCTIONS TO AN ARRAY OF HOSTS

(71) Applicant: Cisco Technology, Inc., San Jose, CA (US)

(72) Inventor: Sagar Borikar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 14/523,285

(22) Filed: Oct. 24, 2014

(65) Prior Publication Data
US 2016/0117279 A1  Apr. 28, 2016

(51) Int. Cl.
G06F 13/00 (2006.01)
G06F 13/40 (2006.01)
G06F 13/38 (2006.01)

(52) U.S. Cl.
CPC ........ *G06F 13/4022* (2013.01); *G06F 13/385* (2013.01); *G06F 13/4081* (2013.01)

(58) Field of Classification Search
CPC ............... G06F 13/385; G06F 13/4022; G06F 13/4081; G06F 2201/815; G06F 2009/45579
See application file for complete search history.

(56) References Cited

U.S. PATENT DOCUMENTS

| 7,502,884 B1 | 3/2009 | Shah et al. |
| 8,386,654 B2 | 2/2013 | Brinkmann et al. |
| 2008/0147938 A1 | 6/2008 | Freimuth et al. |
| 2012/0179932 A1* | 7/2012 | Armstrong ............. G06F 11/20 714/4.11 |
| 2012/0284437 A1 | 11/2012 | Ayzenfeld et al. |
| 2013/0042019 A1 | 2/2013 | Galles et al. |
| 2013/0346531 A1 | 12/2013 | Hummel et al. |
| 2014/0156897 A1 | 6/2014 | Reinke et al. |
| 2014/0156898 A1 | 6/2014 | Luo et al. |
| 2014/0229769 A1 | 8/2014 | Abraham et al. |
| 2015/0254093 A1 | 9/2015 | Ho |

FOREIGN PATENT DOCUMENTS

| CN | 103729042 A | 4/2014 |
| CN | 104021047 A | 9/2014 |
| WO | 2010114910 A1 | 10/2010 |
| WO | 2011022375 A1 | 2/2011 |

OTHER PUBLICATIONS

International Search Report and Written Opinion in counterpart International Application No. PCT/US2015/056817, mailed Dec. 16, 2015, 10 pages.

* cited by examiner

Primary Examiner — Ernest Unelus
(74) Attorney, Agent, or Firm — Edell, Shapiro & Finnan, LLC

(57) ABSTRACT

Systems and methods for connecting a device to one of a plurality of processing hosts. A virtual interface card (VIC) adapter learns the number and location of the hosts and an identification of the device; receives a mapping of the device to a selected host where in the host is selected from the plurality of hosts; and dynamically builds an interface that connects the device to the selected host.

45 Claims, 20 Drawing Sheets

DYNAMIC CONNECTION OF PCIE DEVICES AND FUNCTIONS TO AN ARRAY OF HOSTS

TECHNICAL FIELD

The present disclosure relates to the connection of a device to a particular host processor.

BACKGROUND

Processing hosts often operate in conjunction with one or more peripheral devices. Such devices may allow interfacing with a communications network, a storage system, or a graphics processor, for example. In some cases, an administrator may want to add a custom peripheral device. In a system in which a connected set of hosts is being managed, the administrator determines the appropriate host with which the device is to operate, and manually inserts the physical device. If the device communicates with other components using a protocol, consistent with the Peripheral Component Interconnect Express (PCIe) standard, the administrator must find an extra slot that is compatible with such a device. In some cases, an administrator may want to deploy his own choice of device to make use of a custom application used by hosts in the cartridge. This may not be feasible if the device must be certified by a particular manufacturer in order that a particular discovery and association protocol may be used. Difficulties in attaching a peripheral can occur in other contexts as well. In some situations, the PCIe device may be a device that is compatible with the Single Root Input Output Virtualization (SRIOV) specification. In such cases where the host is unable to make use of the SRIOV capabilities, the resources represented by the virtual functions are unused, making the device practically underutilized. Further, the addition of a PCIe device can be complicated by the need to reboot the OS of a host. Some users need to have application specific PCIe devices that could be used for the specific purpose of deployment in a running chassis. Users generally prefer to avoid rebooting a host or server when adding a new PCIe device. In response, protocols have been developed for "hot plugging" of a PCIe device into a cartridge. Issues can arise if the administrator wants to move a device to a different host or server. Currently there is no mechanism available in the industry to support on-the-fly mapping of the device to a different physical host or server in the same chassis without requiring manual intervention.

DESCRIPTION OF EXAMPLE EMBODIMENTS

Overview

Figure 1:
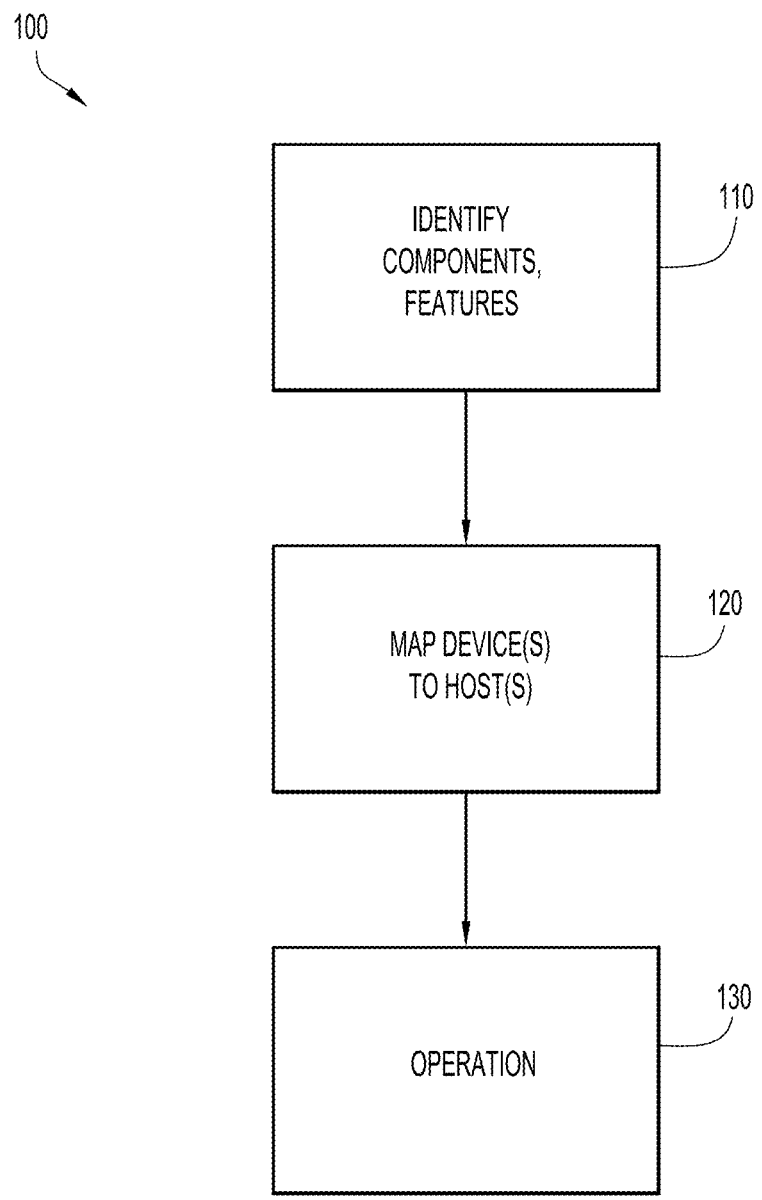
FIG. 1 is a flowchart illustrating the overall operation of the systems described herein, in an example embodiment.

Presented herein are systems and methods for connecting a device to one of a plurality of processing hosts. A virtual interface card (VIC) adapter learns the number and location of the hosts and an identification of the device; receives a mapping of the device to a selected host wherein the host is selected from the plurality of hosts; and dynamically builds an interface that connects the device to the selected host.

Example Embodiments

Processing hosts often operate in conjunction with one or more peripheral devices. Such devices may allow interfacing with a communications network, a storage system, or a graphics processor, for example. In some cases, an administrator may want to add a custom peripheral device. In a system in which a connected set of hosts is being managed, the administrator determines the appropriate host with which the device is to operate, and manually inserts the physical device in an appropriate cartridge that houses the host. If the device communicates with other components using a protocol, consistent with the Peripheral Component Interconnect Express (PCIe) standard, the administrator must find an extra slot that is compatible with such a device, i.e., an available PCIe slot. In an architecture where hosts are arrayed in a set of physical cartridges, the administrator must find a cartridge with an extra PCIe slot. In some cases, an administrator may want to deploy his own choice of device to make use of a custom application used by hosts in the cartridge. This may not be feasible in certain situations, e.g., if the device must be certified by a particular manufacturer in order that a particular discovery and association protocol may be used. This greatly hinders the possibility of using a device that is not supported.

Difficulties in attaching a peripheral can occur in other contexts as well. In some situations, the PCIe device may be a device that is compatible with the Single Root Input Output Virtualization (SRIOV) specification. This is a PCIe specification that enables representation of one or more devices to the host through a single physical device. It allows a PCIe device to appear to be multiple separate physical PCIe devices. SRIOV works by introducing the idea of physical functions (PFs) and virtual functions (VFs). Physical functions are full-featured PCIe functions; virtual functions are "lightweight" functions that have limited functionality. SRIOV mandates the PCIe device to represent all PFs and VFs to a single host. A function cannot be used if the host platform is not aware of the SRIOV functionality and if the operating system (OS) does not have support for handling a SRIOV feature presented by the device. In such cases where the host is unable to make use of the SRIOV capabilities, the resources represented by the virtual functions are unused, making the device practically underutilized. In such situations, therefore, even if the PCIe device can be connected to a host, the connection may not be fully realized because virtual functions cannot be used by the host.

Further, the addition of a PCIe device can be complicated by the need to reboot the OS of a host. Some users need to have application specific PCIe devices that could be used for the specific purpose of deployment in a running chassis. Users generally prefer to avoid rebooting a host or server when adding a new PCIe device. In response, protocols have been developed for "hot plugging" of a PCIe device into a cartridge. This phrase refers to the installation of the PCIe device without requiring a reboot. The hot plugging mechanism requires a hot plug capable PCIe switch device that can accept the hot plug protocol and allow seamless integration of the device without requiring the reboot of the OS. The OS with hot plug support can detect, enumerate and work with the new device that has been inserted in the system. Also the administrator must be aware of the hot plug mechanism as per the protocol in order to achieve the run time configuration of the device without requiring reboot.

Issues can arise if the administrator wants to move a device to a different host or server. He generally needs to manually insert the device in the cartridge, if the cartridge has an extra PCIe slot available. Each cartridge on which the hot plug device is to be supported has a switch or root port that supports the hot plug functionality. It can be difficult to check the location of the cartridge, open the chassis, look for the hot plug capable switch and appropriate downstream slot, and place the device in that slot, even if the operating system supports hot plug functionality. This greatly hinders the possibility of using third party PCIe adapters during run time with features that are not supported by a virtual interface card (VIC). An administrator may want to deploy his own choice of device to make use of a custom application used in a host in the cartridge or rack. The administrator may also want to change the association of the hot plug capable device to different hosts, based on the customization of the application that he wants to have per cartridge or host. Presently, if the administrator wants to bind the PCIe device to a particular host in a chassis or rack without rebooting the server, he removes the PCIe device from one downstream slot of a PCIe switch, moves it to a downstream slot of another host's hot plug capable PCIe switch and performs the hot plug insertion procedure. Currently there is no mechanism available in the industry to support on-the-fly mapping of the device to a different physical host or server in the same chassis without requiring manual intervention and physical movement of the adapter from one cartridge or rack to another.

FIG. 1 illustrates the overall processing of the system described herein. At 110, system components are identified. Such components would include the set of processing hosts and one or more devices requiring connection to respective hosts. In embodiments, these devices may communicate using a protocol consistent with the Peripheral Component Interconnect Express (PCIe) standard. In this document, such devices are known as "PCIe devices." At 120, each of the devices is mapped to a respective host in the set of hosts. As will be discussed in greater detail below, this mapping includes both the logical association between a device and a host, as well as the connection between them that allows communication. At 130, operation can begin. Such operation may, for example, include execution of an application on a host where the application makes use of the device mapped to it.

In an embodiment, an administrator identifies the physical device inventory reported by a computing system manager module (CSM), where the physical device(s) are behind a VIC adapter. A device may be identified by enumerated bus, device and function (BDF). In particular, the devices reside behind logic, implemented in firmware in an embodiment and resident in the VIC adapter, that facilitates the connection between each device and a host. A determination is made as to how many hosts are supported. In some situations, the hosts may be organized in a particular topology. For example, host machines may be arranged in a set of cartridges, with some number of hosts in each cartridge. In an embodiment, there may be eight cartridges used, each having two hosts. As many as 16 hosts may then be in communication with the VIC adapter in such an embodiment. A particular host may be identified by in terms of a cartridge identifier and an instance identifier, where the latter specifies a particular host within a cartridge.

Figure 2:
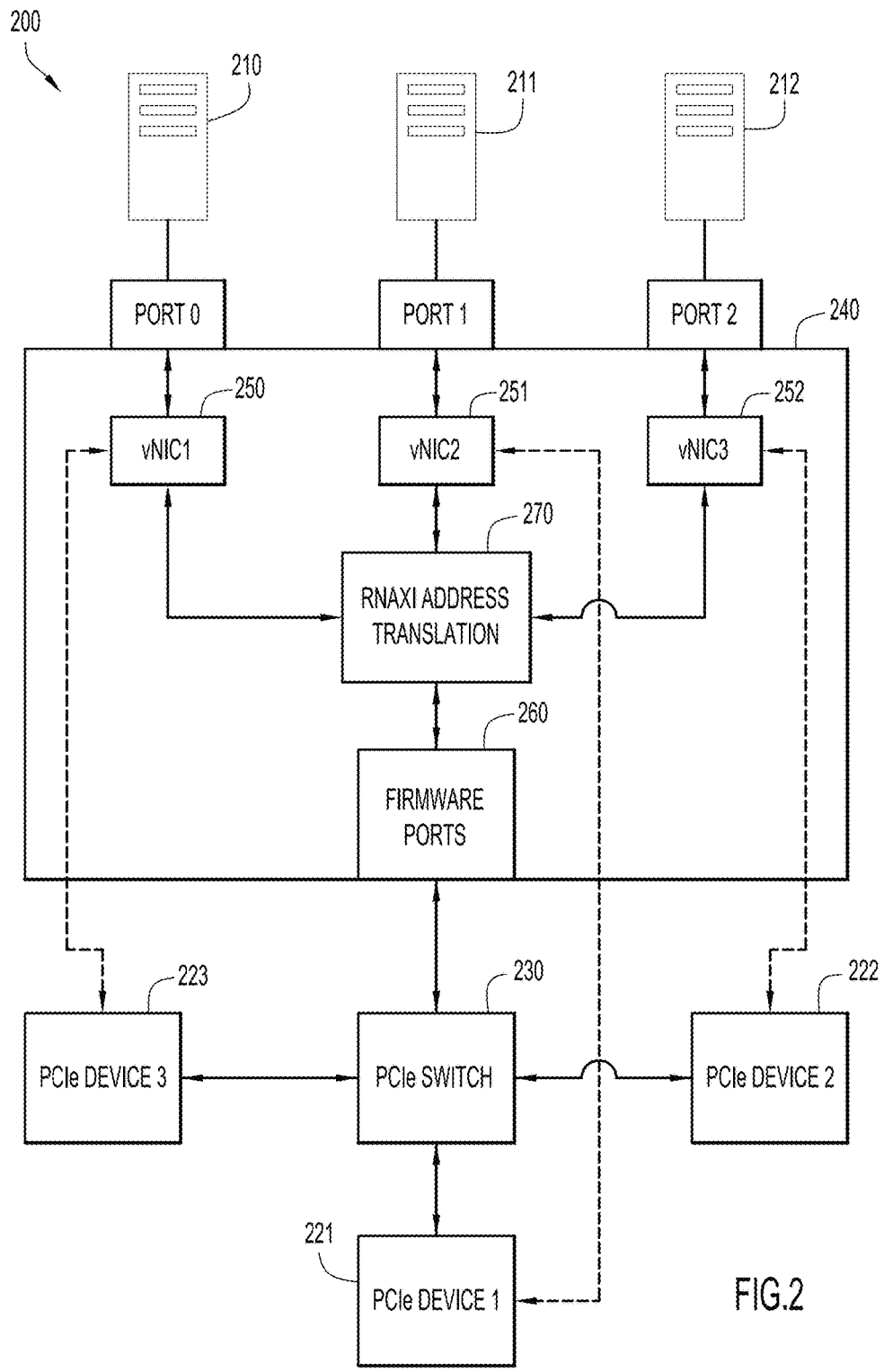
FIG. 2 is a block diagram of a system for dynamic connection of a Peripheral Component Interconnect Express (PCIe) device to a set of hosts, in an example embodiment.

An example system is illustrated in FIG. 2, according to an embodiment. A set of hosts 211, 212, and 213 is shown. A set of PCIe devices 221, 222, and 223 is also shown. Examples of such PCIe devices may include communications interface cards, graphics processor cards, and storage interface cards. These examples are not to be construed as limiting. A PCIe device can be connected to one of the hosts through a PCIe switch 230 and a VIC adapter 240. In some embodiments, the VIC adapter may be implemented as an application specific integrated circuit (ASIC). Access to the hosts 210, 211, and 212 may be attained through respective interfaces, shown in this example as virtual network interface cards (vNICs) 250, 251, and 252. As will be described below in greater detail, the mapping of each PCIe device to a particular host is implemented through the operation of, for example, firmware 260 in the VIC adapter 240, where the firmware 260 operates in conjunction with an address translation module 270. The logic in firmware 260 and address translation module 270 manipulates the addressing to connect each PCIe device to an appropriate host.

Figure 3:
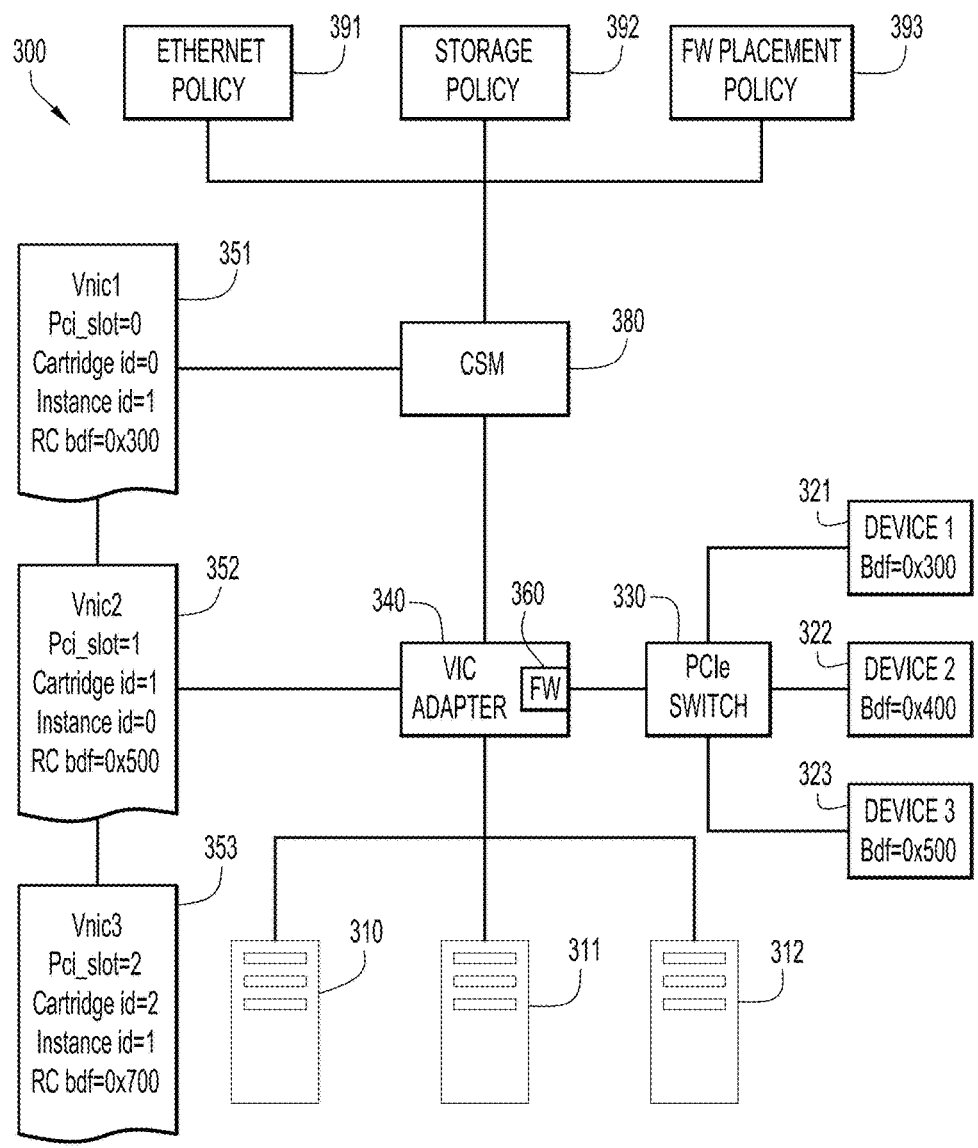
FIG. 3 is a further block diagram of a system for dynamic placement of a PCIe device, in an example embodiment.

Additional features of such a system are shown in FIG. 3, from an administrative perspective. As in the previous example, each of several PCIe devices is mapped to a particular host. Three hosts are shown, 310, 311, and 312, along with three PCIe devices 321, 322, and 323. In this example, these PCIe devices have BDF values of 0x300, 0x400, and 0x500 respectively. The PCIe devices are connected to a VIC adapter 340, via a PCIe switch 330. The interfaces for the hosts are shown as vNICs 351, 352, and 353. Each shows a cartridge identifier and instance within the cartridge for its associated host. A computing system management module CSM 380 is also shown in communication with the VIC adapter 340 and the hosts' vNICs 351, 352, and 353. The mapping of PCIe devices and hosts, along with other operations of system 300, may be constrained in this example by a variety of policies, shown as Ethernet policy 391, storage policy 392, and placement policy 393. The constraints in these policies are implemented through the CSM 380.

Figure 4:
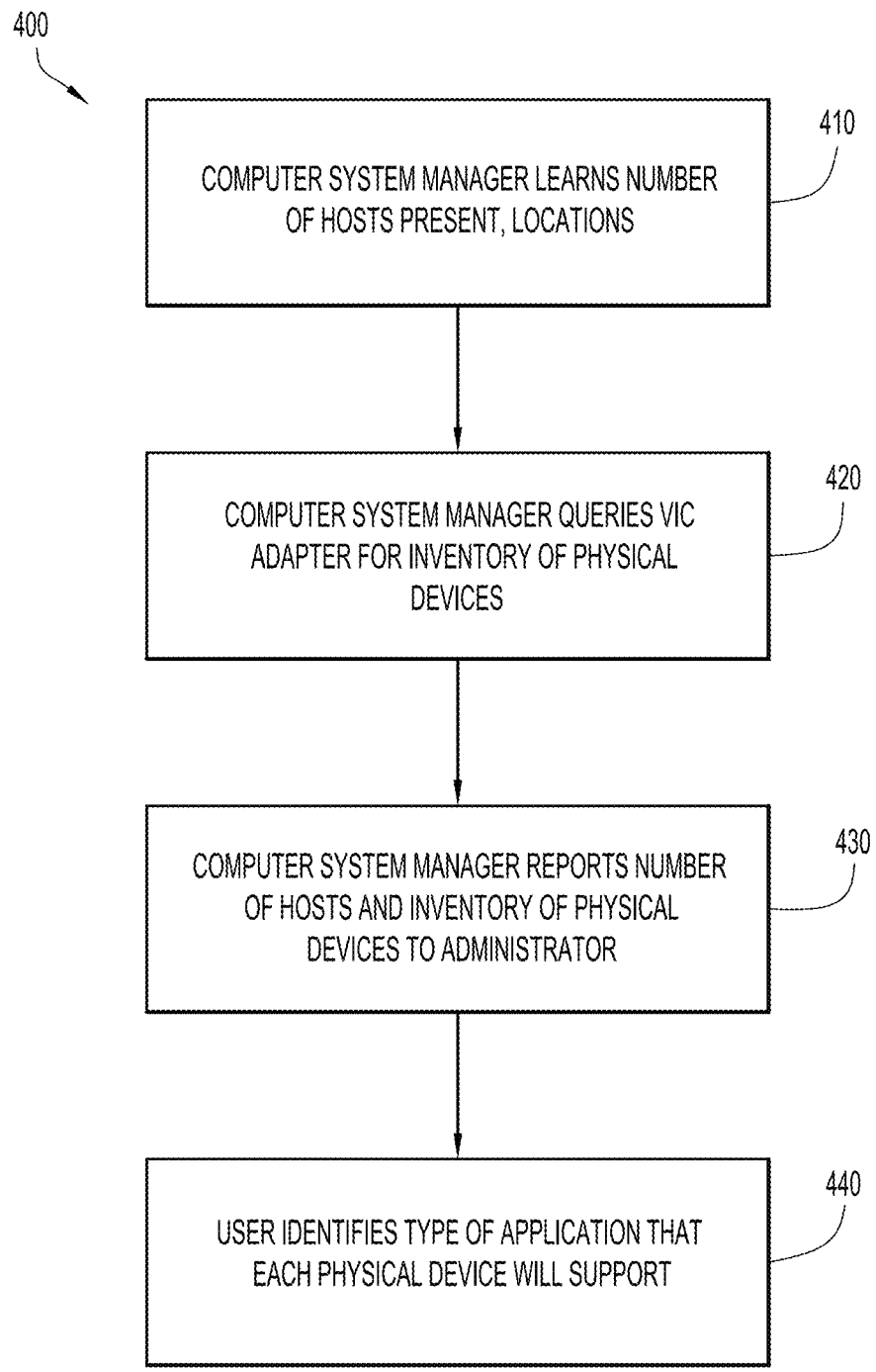
FIG. 4 is a flowchart illustrating identification of components for dynamic connection of a PCIe device to a set of hosts, in an example embodiment.

A process by which the hosts and peripheral devices may be identified is illustrated in FIG. 4, according to an embodiment. At 410, the CSM learns the number of hosts that are present, along with their locations. As mentioned above, the location of a host may include an identifier of its cartridge, and an identifier of the host within the cartridge. In an embodiment, this information may be reported to the CSM by other management components in the system, such as a chassis management controller and/or a base management controller. At 420, the CSM queries the VIC adapter to obtain an inventory of the devices attached to the VIC adapter. The inventory may include slot locations and BDF values for each device. At 430, the CSM reports the number of hosts and the inventory of devices to an administrator. This may take place through a graphical user interface (GUI) and/or a command line interface (CLI), for example. At 440, the user identifies the type of application that each physical device will support.

Figure 5:
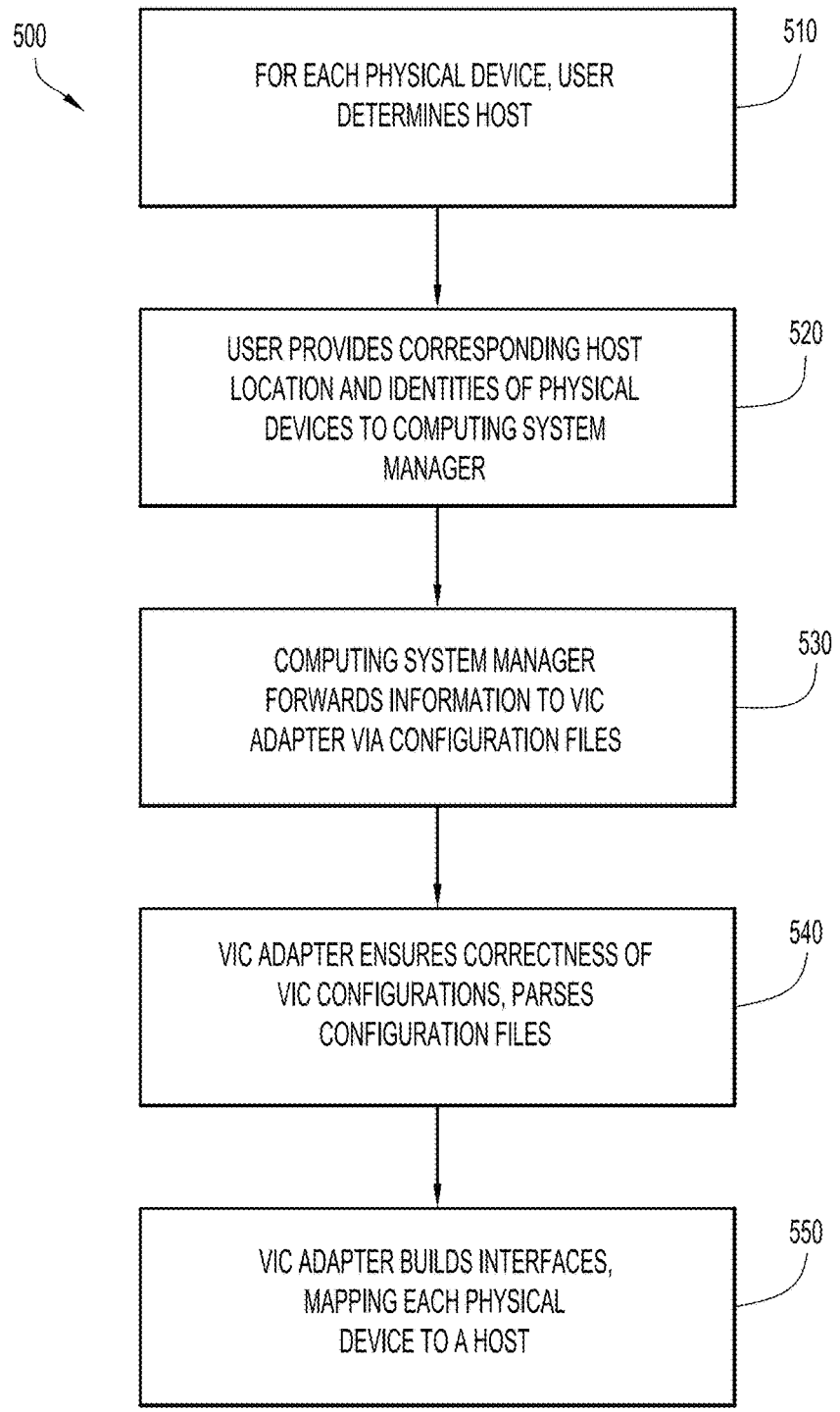
FIG. 5 is a flowchart illustrating the mapping of hosts and physical devices in the dynamic connection of a PCIe device to a set of hosts, in an example embodiment.

FIG. 5 illustrates a process for mapping a device to a host, according to an embodiment. At 510, the user identifies a particular host to which a physical device is to be mapped. This may be based, for example, on the user's understanding of the features supported by the device and which host needs such features. At 520, the user provides the location of this identified host and the identity of the corresponding device to the CSM. The host and its location may be specified by a cartridge identifier and an identifier of the host within the cartridge. The corresponding device may be identified by its BDF value. At 530, the CSM forwards the information received from the user to the VIC adapter. In an embodiment, the CSM writes this information into one or more configuration files that are then read by the VIC adapter. At 540, the VIC adapter may validate the correctness of this information and parse the information to obtain the data it employs to perform the processing of 550, where the VIC adapter builds interfaces that map the physical device to the appropriate host. The building of such an interface may entail translation of the address in a base address register (BAR) of the host's vNIC to the device's address, where the latter address is that of the device in the addressing scheme of the VIC adapter firmware. This translation is facilitated by a translation module, such as the register new advanced extensible interface (RNAXI) address translation module 270 of FIG. 2. The firmware may also map the configuration space of the firmware's physical device address space to the vNIC's configuration base address through the RNAXI translation.

Once the mapping is complete and the interfaces are built, the VIC adapter informs the CSM of this, and the CSM can then start the host's cartridge and start the OS running on the host. The host can then use the device as if the device were locally connected to the host. When the host tries to access the BAR of its vNIC, the address is converted to the firmware-translated address space of the VIC adapter. When direct memory access (DMA) is executed in the upstream direction from device to the host, DMA addresses provided by the host can be given directly to the device. The device can then issue a DMA, which in turn is translated through the RNAXI translation to the host. The data is then written appropriately into the host memory. In this way, both upstream and downstream address translations are completed using the RNAXI address translation programmed by the VIC adapter firmware.

While the processing illustrated in FIG. 5 and discussed here relates to a single device, it is to be understood that multiple devices may be connected to the VIC adapter (as illustrated in FIGS. 2 and 3) and such devices would be mapped to appropriate hosts using the same process.

Figure 6:
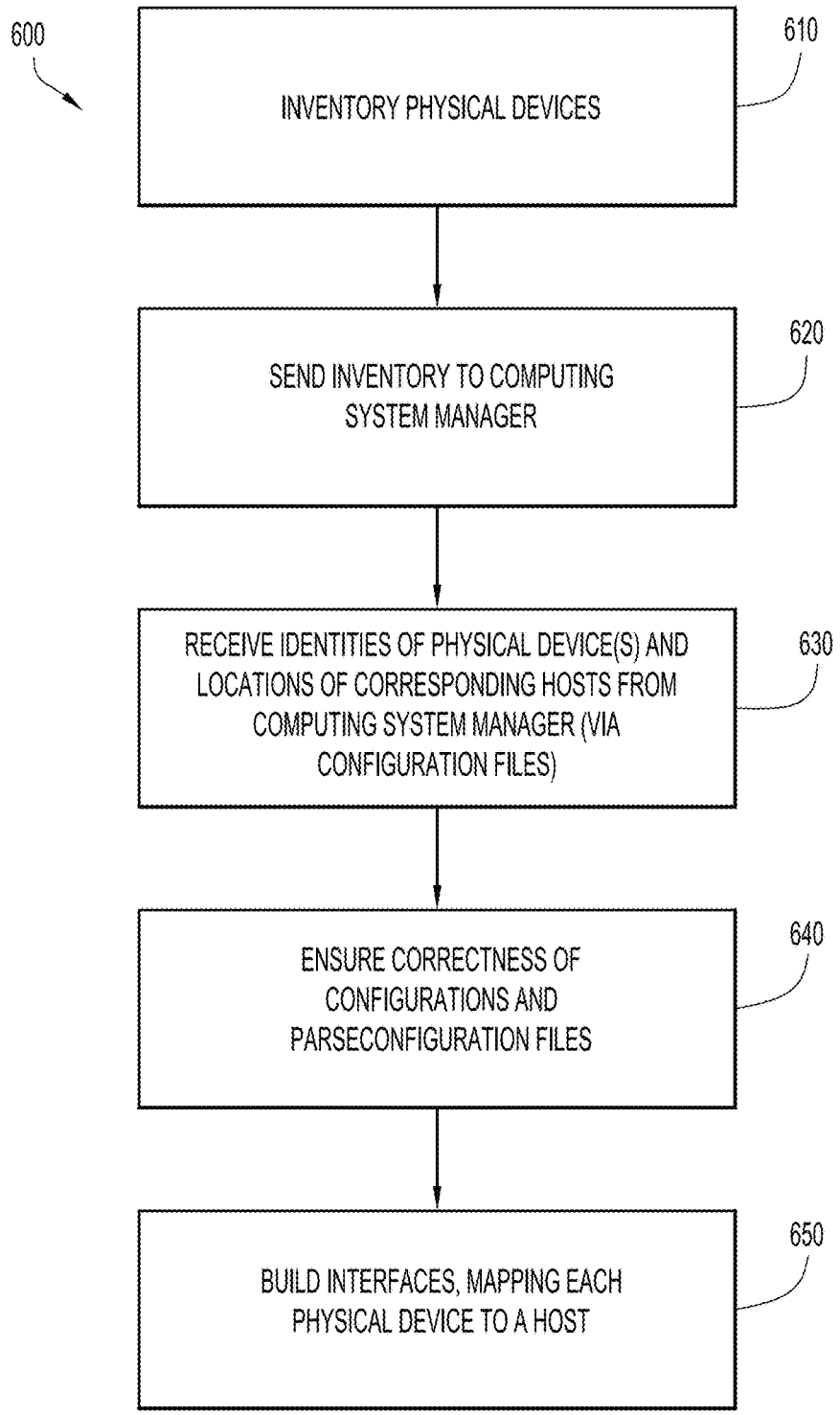
FIG. 6 is a flowchart illustrating the identification and mapping of hosts and physical devices in the dynamic connection of a PCIe device to a set of hosts from the perspective of a virtual interface card (VIC) adapter, in an example embodiment.

The above processing is illustrated in FIG. 6 from the perspective of the VIC adapter, according to an embodiment. At 610, the VIC adapter inventories the devices that are attached to it, learning their identities. At 620, the inventory is sent to the CSM. As described above, the inventory is sent to the CSM in response to a query from the CSM. At 630, the VIC adapter receives identifications of the devices and the locations of hosts that have been associated with the devices, via one or more configuration files. At 640, the VIC adapter ensures (i.e., validates) the correctness of the configuration file(s) and parses them. At 650, the VIC adapter builds the necessary interface connecting the hosts and the devices in the manner described above.

As discussed above, the PCIe device may be a SRIOV-capable device. Such a device can be connected to the firmware of the VIC adapter. The SRIOV device can be mapped to a single host representing a physical function and a set of virtual functions. In the case of a hypervisor deployment, the hypervisor maps virtual functions to guest operating systems and extends performance by removing the dependency on the hypervisor, such that the hypervisor is no longer the liaison between a guest OS and the VIC adapter. SRIOV enables the virtual functions to be mapped directly to the guest OSs. In a hypervisor deployment, the PCIe device that supports SRIOV may be limited to one physical host.

In the SRIOV-based embodiments described below, an administrator can configure, at run time, any virtual function to map to any host, thus separating the physical function from the VIC adapter. The administrator can specify the identity of the SRIOV-capable device using a BDF value, and identify the host number in terms of cartridge identifier and host identifier within the cartridge. The SRIOV-device can represent the virtual and physical functions to the VIC adapter as a single entity, and the firmware of the VIC adapter can trap the configuration space transactions and memory transactions initiated from the host. The SRIOV based-device can represent a VF as a virtual PCIe device. The administrator can also choose more than one VF to be mapped to the same host, or map a VF to more than one host, making the architecture flexible and adaptive to an application running on the host.

Figure 7:
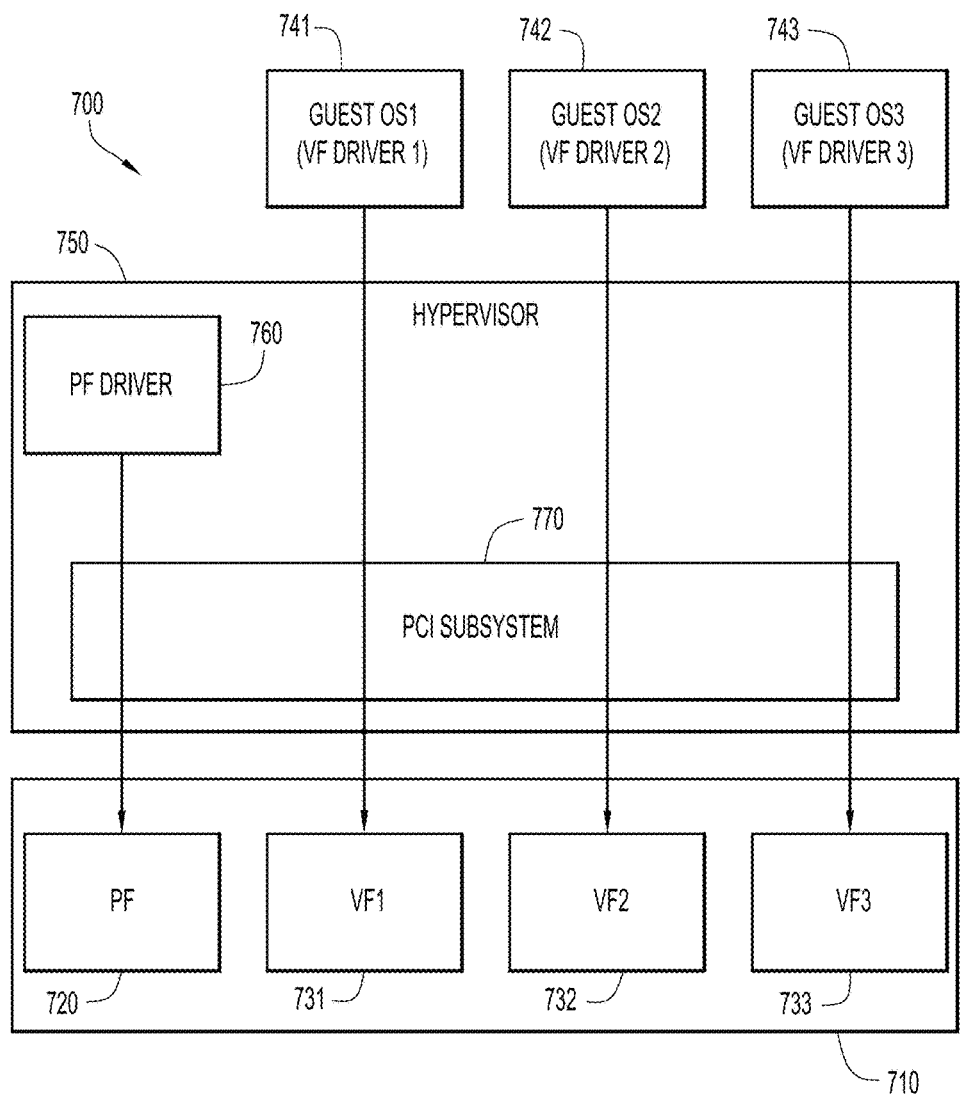
FIG. 7 is a block diagram of the logical connections of virtual functions in a single root input/output virtualization (SRIOV) device to guest operating systems, in an example embodiment.

Such an embodiment is illustrated in FIG. 7. The SRIOV-capable device is shown as device 710, and includes a physical function (PF) 720 and virtual functions (VFs) 731, 732, and 733. The VFs in this example have been mapped to three respective virtual hosts, whose guest operating systems are shown as 741, 742, and 743. Interaction between the hosts and the VFs is mediated by hypervisor 750 and, in particular, a PCI subsystem 770 in hypervisor 750. The hypervisor 750 also includes a driver 760, for PF 720. The PF driver 760 determines how many VFs will be enabled. In this example, three VFs are enabled.

Figure 8:
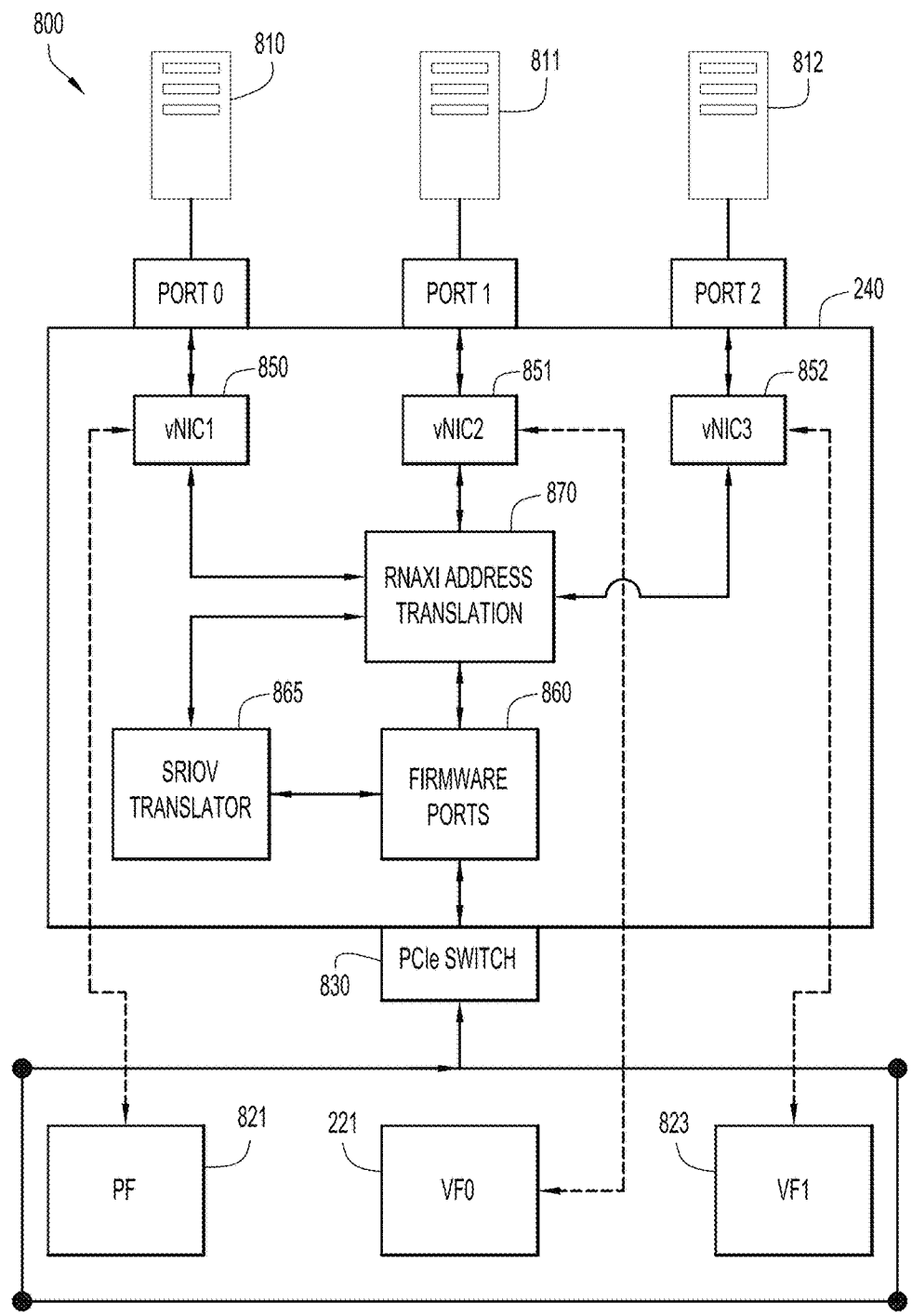
FIG. 8 is a block diagram of a system connecting a SRIOV-capable device to a set of hosts, in an example embodiment.

Such an embodiment is further illustrated in FIG. 8. A set of hosts 810, 811, and 812 is shown. A SRIOV capable PCIe device 820 is also shown. This device includes a set of functions, PF 821 and VFs 822 and 823. A virtual function can be connected to one of the hosts through a PCIe switch 830 and a VIC adapter 840. Access to the hosts 810, 811, and 812 may be attained through respective interfaces, shown in this example as virtual network interface cards (vNICs) 850, 851, and 852. As will be described below in greater detail, the mapping of each VF to a particular host is implemented through the operation of firmware 860 in the VIC adapter 840, where the firmware 860 operates in conjunction with an address translation module 870 and SRIOV translator 865. The logic in firmware 860, address translation module 870, and SRIOV translator 865 manipulates the addressing to connect each VF to an appropriate host.

Figure 9:
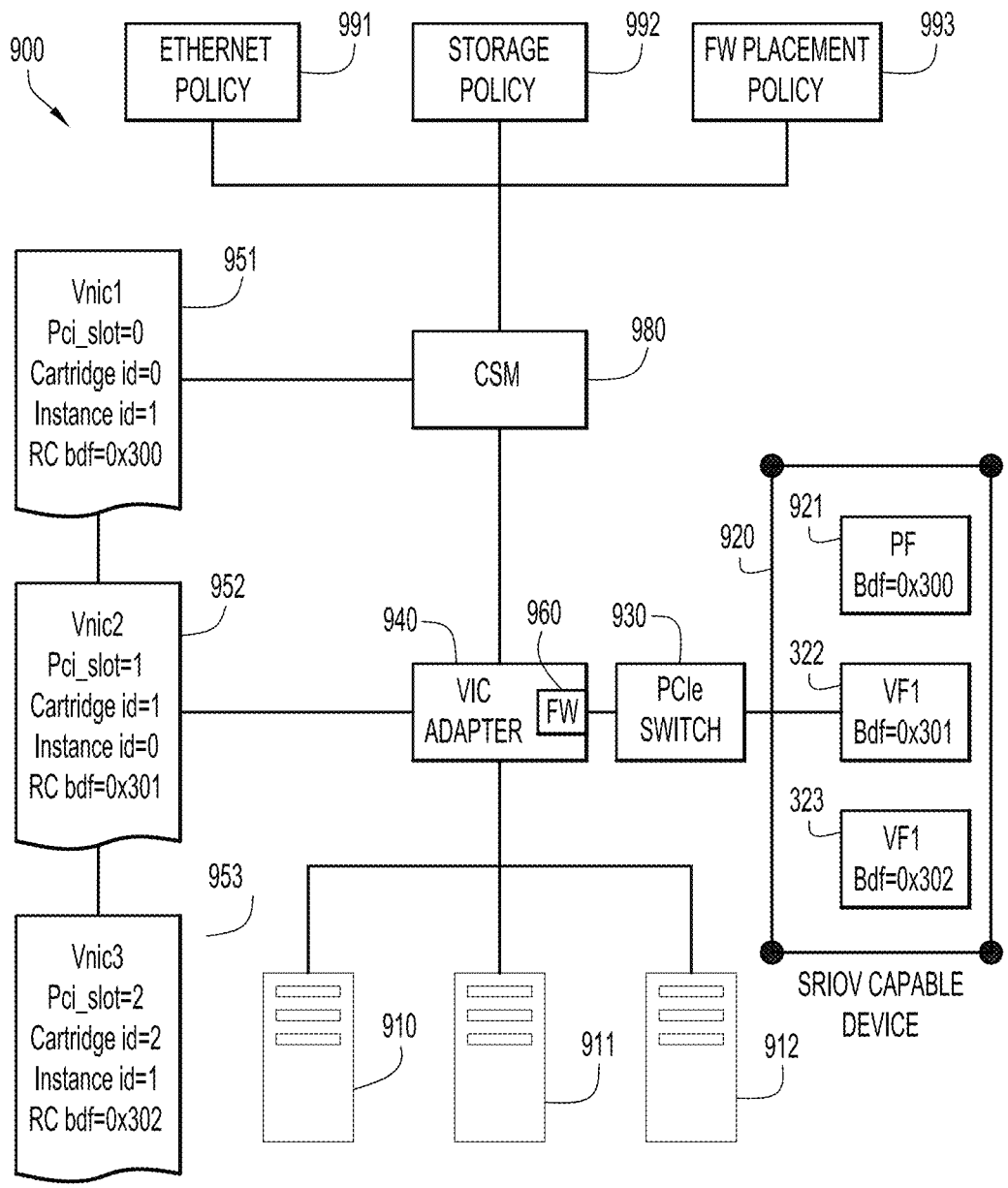
FIG. 9 is a further block diagram of a system connecting a SRIOV-capable device to a set of hosts, in an example embodiment.

Additional features of such a system are shown in FIG. 9. As in the previous illustration, each of several VFs is mapped to a particular host. Three hosts are shown, 910, 911, and 912, along with a SRIOV-capable device 920. The latter device includes a PF 921 and VFs 922 and 923. In this example, these functions have BDF values of 0x300, 0x301, and 0x302 respectively. The SRIOV-capable device 920 is connected to a VIC adapter 940, via a PCIe switch 930. The interfaces for the hosts are shown as vNICs 951, 952, and 953. Each shows a cartridge identifier and instance within the cartridge for its associated host. A system management module CSM 980 is also shown in communication with the VIC adapter 940 and the hosts' vNICs 951, 952, and 953. The mapping of VFs and hosts, along with other operations of system 900, is constrained in this example by a variety of policies, shown as Ethernet policy 991, storage policy 992, and placement policy 993. The constraints in these policies are implemented through the CSM 980.

Figure 10:
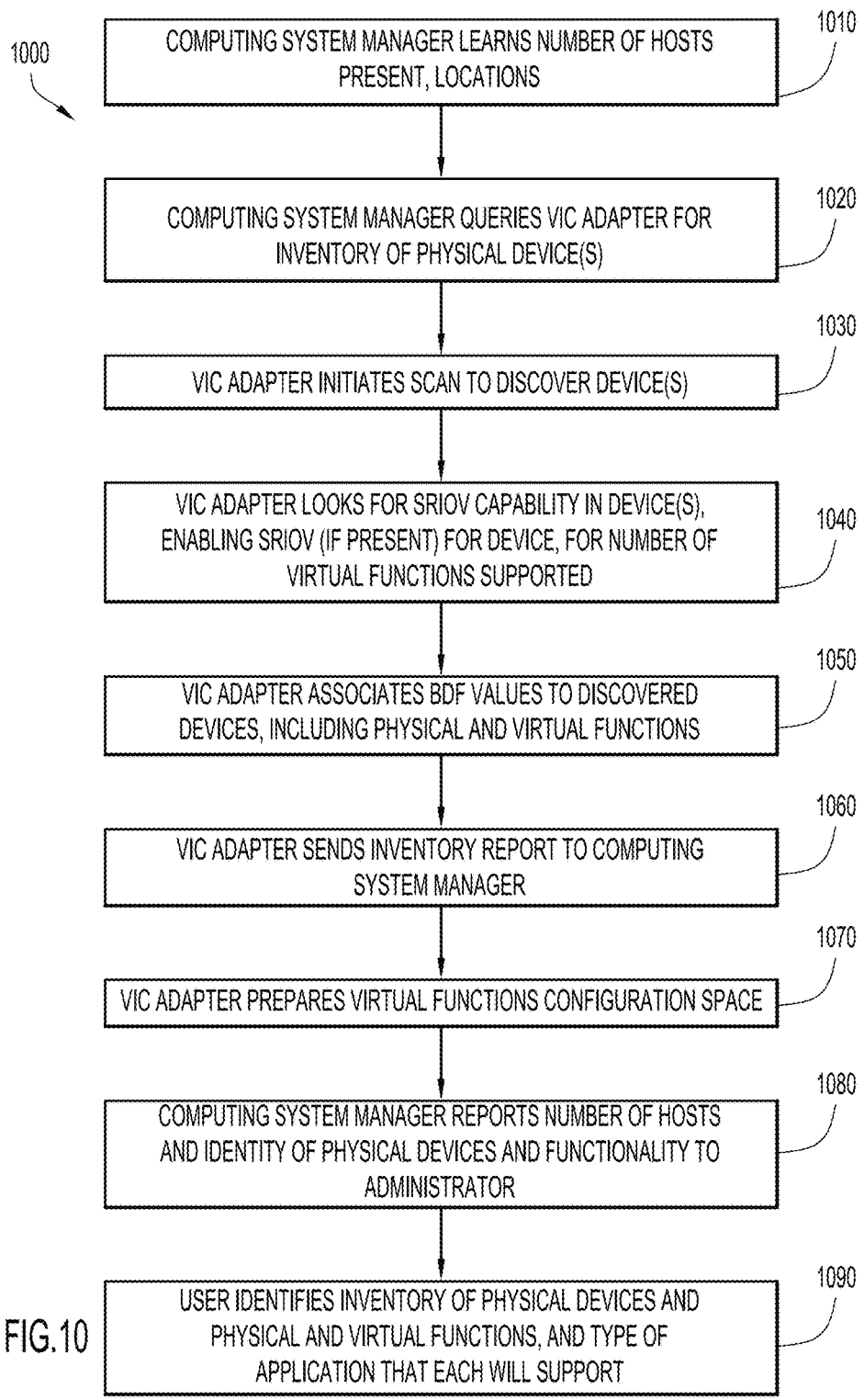
FIG. 10 is a flowchart illustrating a process for identification of components in the connection of a SRIOV-capable device to a set of hosts, in an example embodiment.

A process for identifying components (i.e., hosts, PCIe devices, VFs and PFs) in systems such as those shown in FIGS. 7-9 is illustrated in FIG. 10, according to an embodiment. At 1010, a CSM learns the number of hosts present, and their locations. In an embodiment, this information is provided to the CSM by a base management controller (BMC) and/or a chassis management controller (CMC), which report information regarding the servers and cartridges present in the system. At 1020, the CSM queries the VIC adapter for an inventory of PCIe devices behind the VIC adapter. At 1030, the VIC adapter initiates a bus scan to learn of such devices. At 1040, the VIC adapter looks for SRIOV capability in any discovered device, and enables SRIOV capability (if present) for the device, for the number of VFs that are supported. At 1050, the VIC adapter associates BDF values to any discovered PCIe devices, including PFs and VFs. The bus addresses are associated with the BAR of the SRIOV-capable device. This allows the VIC adapter to access the register space of the device. BAR addresses are also assigned to the VFs, so that the register space of each individual VF can be accessed independently. At 1060, the VIC adapter sends the inventory to the CSM, including the slot locations and BDFs of the discovered devices. At 1070, the VIC adapter prepares a VF configuration space as a real configuration space. This real configuration space is distinct from the default configuration space that is otherwise reported by the VFs. At 1080, the CSM reports the number of hosts and the identity of discovered devices and their functionality to the administrator. As before, this may be provided via a CLI or a GUI. At 1090, the user identifies the inventory of the PCIe devices and the SRIOV-capable devices' PFs and VFs, and determines which devices and functions need to be mapped to what hosts based on the type of application each function is going to support.

Figure 11:
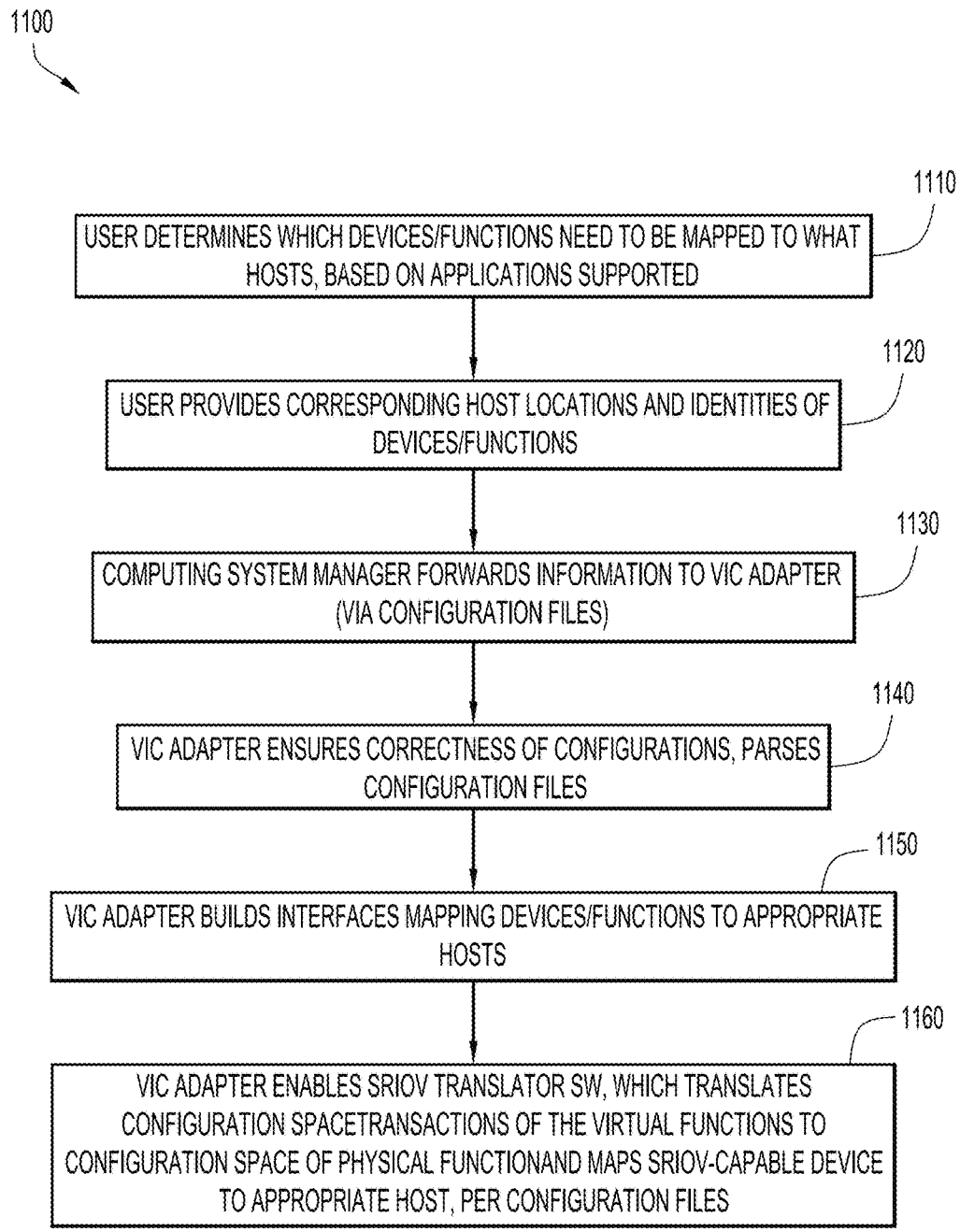
FIG. 11 is a flowchart illustrating a process for the mapping of components in the connection of a SRIOV-capable device to a set of hosts, in an example embodiment.

The mapping of functions to hosts in the case of a SRIOV-capable PCIe device is illustrated in FIG. 11, according to an embodiment. At 1110, the user determines which devices and functions are to be mapped to which hosts, based on applications supported by the devices and functions. At 1120, the user provides the locations of particular hosts and the identities of devices and functions that are to be mapped to these hosts. At 1130, the CSM forwards this mapping information to the VIC adapter, which receives the mapping. In an embodiment, this communication is done via one or more configuration files. At 1140, the VIC adapter ensures the correctness of the data in the configuration files, and parses these files. At 1150, the VIC adapter dynamically builds one or more interfaces that connect the devices and virtual and physical functions to the appropriate hosts. At 1160, the VIC adapter enables SRIOV translation logic (shown as module 865 in FIG. 8), which translates configuration space transactions of the virtual functions to a configuration space of the physical function. This logic also maps the SRIOV-capable device to the appropriate host, as specified in the configuration file of the vNIC for that host.

Once the mapping is complete, the device is mapped to the vNIC of the associated host. The VIC adapter informs the CSM that it is ready to proceed. The CSM then starts the cartridge and starts the OS running on the host, which can now work with the physical device as if attached locally to that host.

In an embodiment, firmware in the VIC adapter translates the BAR of a vNIC to the device's address, using the RNAXI translation from the host-provided address to the VIC adapter's local addressing scheme. The firmware may also map the configuration space of the physical device address space of the VIC adapter to the vNIC's configuration base address through the RNAXI translation in case of the physical function. For VFs, the firmware creates custom configuration space for the vNIC that emulates a section of the PF's configuration space. But this does not represent the actual configuration space of the VFs.

When the host tries to access the configuration space of a VF using the BDF value, the SRIOV translator module will translate the address appropriately to drive the virtual function or the physical function based on the mapping of the vNIC to the SRIOV-capable PCIe device. The translated address will, in turn, be translated to the device's address space using RNAXI translation. When the host tries to access the BAR of the virtual function mapped to it, the address gets converted to the firmware-translated address space of the device.

When DMA is expected in the upstream direction from the device to the host, DMA addresses provided by the host may be given directly to the device. Upstream address translation for PFs and VFs happen in the same way. The device then issues a DMA which in turn is translated through RNAXI translations to the host, placing the data appropriately into the host memory.

Note that the SRIOV translation module primarily translates the downstream configuration space accesses from the hosts issued to vNICs, to the appropriate physical or virtual functions of the SRIOV-capable device. If the request belongs to the physical function, then it is passed as is to the device without changing offsets. If the request belongs to the virtual function, then the translation module takes appropriate action based on which section of the virtual function's configuration space needs to be updated and what portion of the configuration space of the associated vNIC needs to be updated. For each vNIC backing the virtual function in the SRIOV device, the SRIOV translation module has custom configuration space.

When a host wants to update the configuration space of the vNIC mapping to the virtual function, the SRIOV translation module performs two operations: 1) update of the appropriate configuration space of the virtual function based on the type of request is issued, and 2) update of the device's configuration space after the virtual function's configuration space is updated. The response for the configuration space request may be furnished by the SRIOV translation module after completing the activity in virtual function's configuration space.

Figure 12:
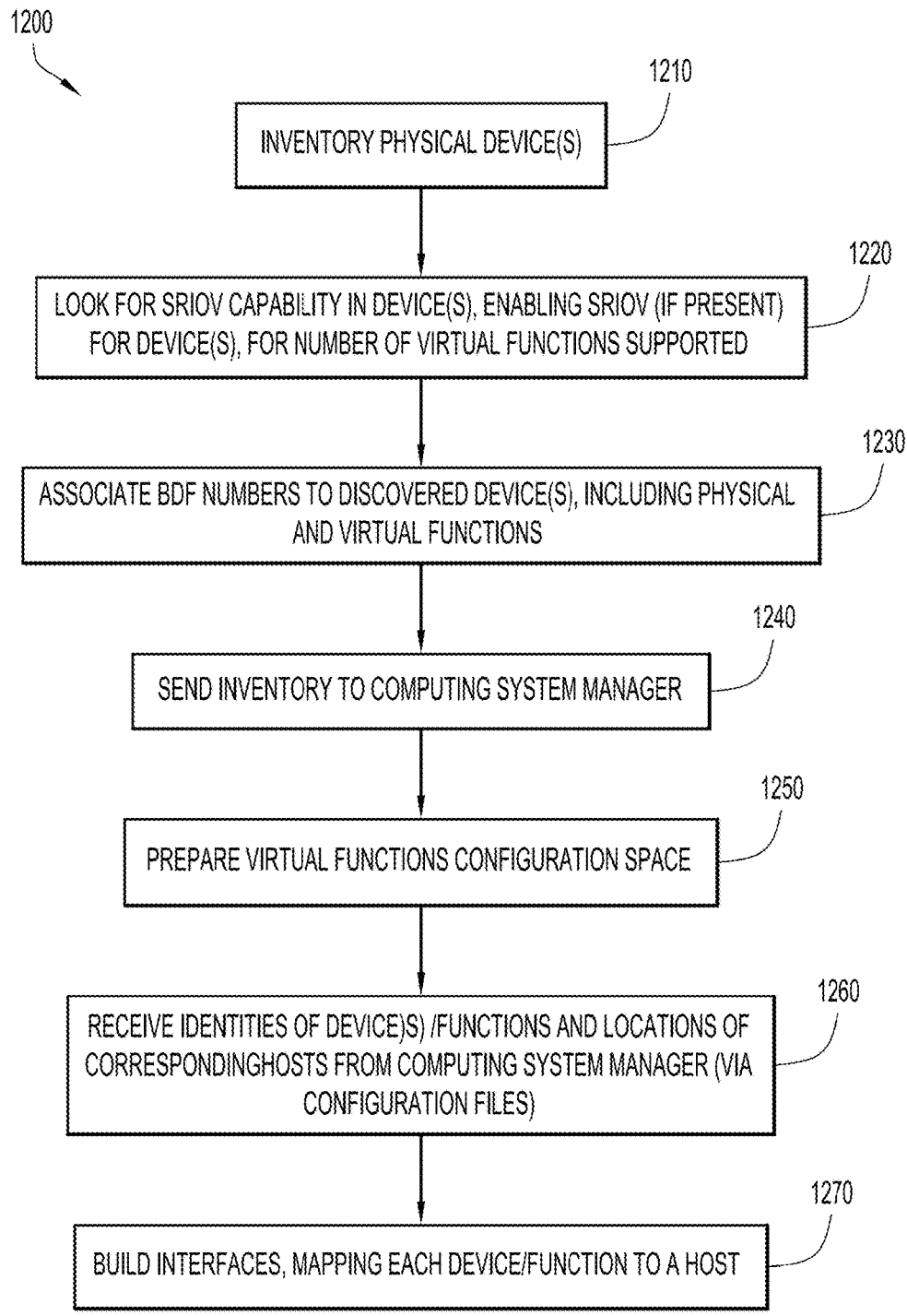
FIG. 12 is a flowchart illustrating a process for the identification and mapping of components in the connection of a SRIOV-capable device to a set of hosts from the perspective of the VIC adapter, in an example embodiment.

The above processing, from the perspective of the VIC adapter, is illustrated in FIG. 12, according to an embodiment. At 1210, an inventory of the attached devices is performed. At 1220, the VIC adapter looks for SRIOV capability in the devices, enabling SRIOV in such devices, for the number of VFs supported. At 1230, BDF values are associated with the discovered devices, including PFs and VFs. At 1240, the inventory is sent to the CSM. At 1250, a configuration space for the VF(s) is prepared. At 1260, the identities of devices and function, plus the locations of corresponding hosts is received from the CSM via one or more configuration files. At 1270, interfaces are built, mapping each device and function to a host.

As discussed above, hot plug capability can also be desirable for connecting, moving, or removing a PCIe device in an array of hosts. Using the systems and methods described below, once such a device is discovered properly at the VIC adapter, the administrator does not need to perform any manual intervention for further hot plug insertion/removal at different physical hosts in the same chassis. The administrator can choose which host will be mapped with the newly discovered PCIe device without requiring the host to reboot. The administrator can choose to perform hot plug removal of a device from one cartridge and then add it to another host in the same chassis without requiring the reboot of the two distinct physical hosts in question, all without manual intervention. Moreover, the administrator can choose the host to which the device will be mapped, based on the type of application running on the host. He can also associate a hot plug insertion/removal policy of the device to that cartridge.

Figure 13:
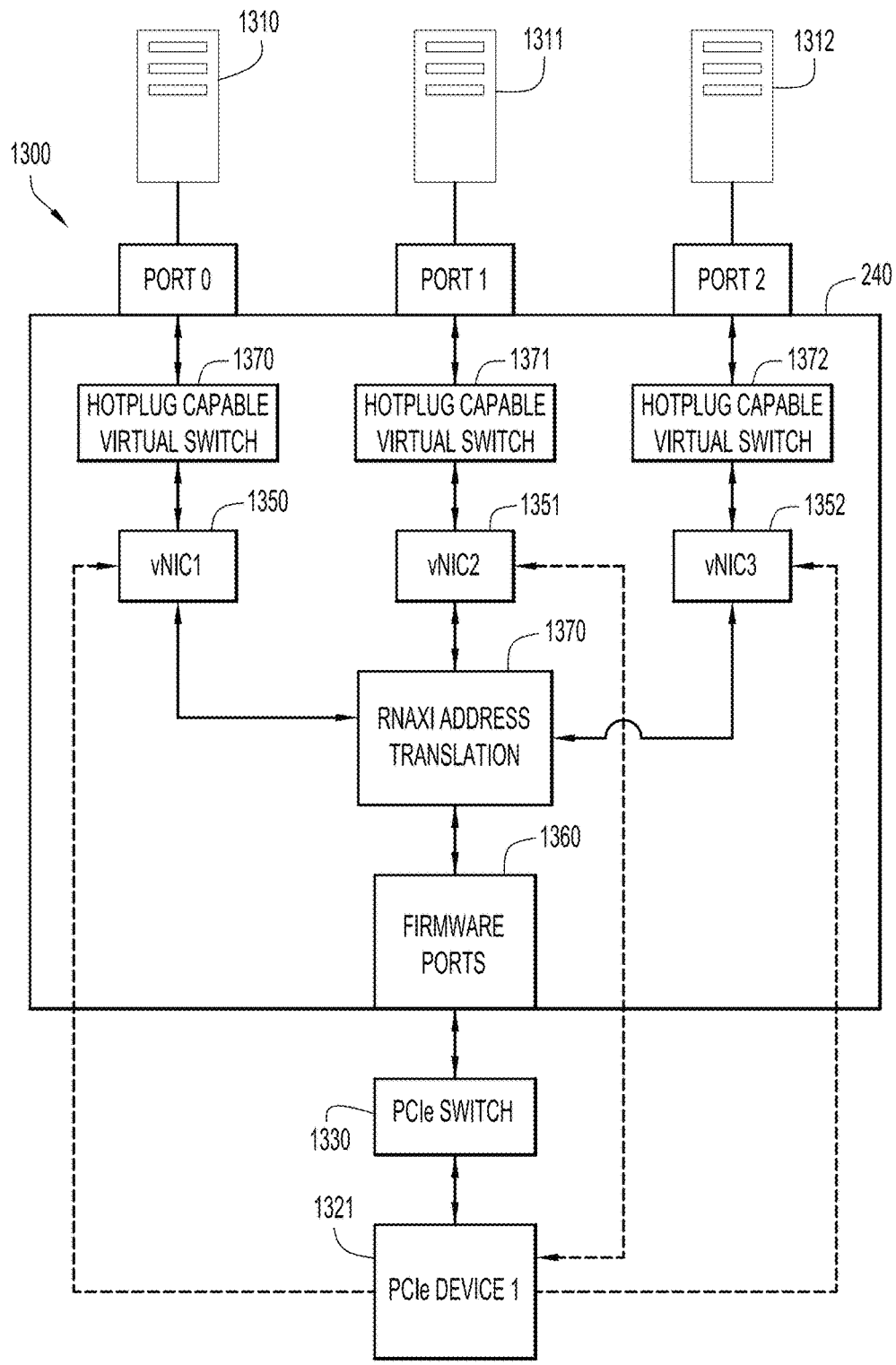
FIG. 13 is a block diagram of a system connecting a hot pluggable device to a set of hosts, in an example embodiment.

A system for implementing such functionality is illustrated in FIG. 13. A set of hosts 1310, 1311, and 1312 is shown. A SRIOV capable PCIe device 1321 is also shown. This device can be connected to one of the hosts through a PCIe switch 1330 and a VIC adapter 1340. Access to the hosts 1310, 1311, and 1312 may be attained through respective interfaces, shown in this example as vNICs 1350, 1351, and 1352. The vNICs are connected to their hosts through respective hot plug capable switches 1370, 1371, and 1372. As will be described below in greater detail, the mapping of device 1321 to a particular host is implemented through the operation of, for example, firmware 1360 in the VIC adapter 1340, where the firmware 1360 operates in conjunction with an address translation module 137. The logic in firmware 1360 and address translation module 1370 manipulates the addressing to connect device 1321 to an appropriate host.

Figure 14:
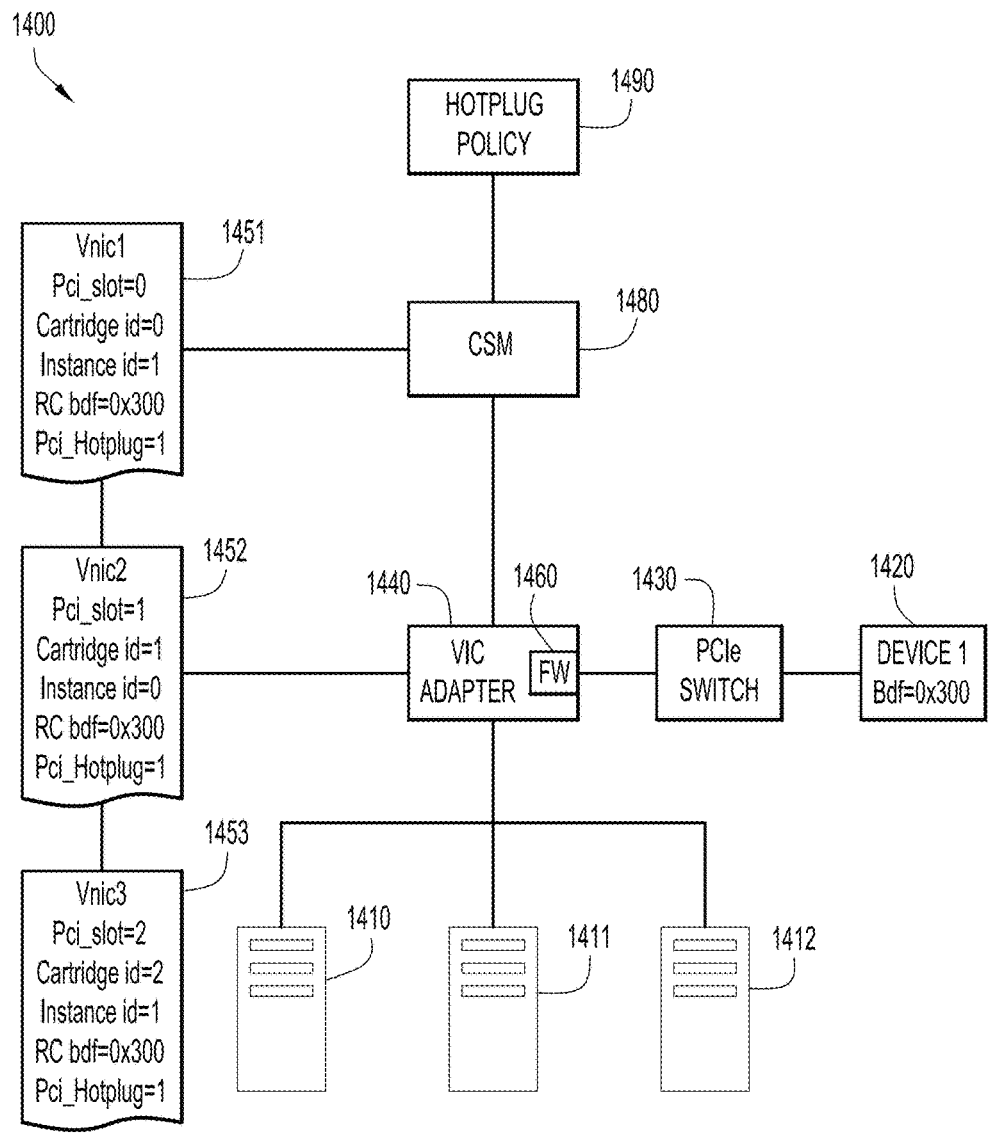
FIG. 14 is a further block diagram of a system connecting a hot pluggable device to a set of hosts, in an example embodiment.

Additional features of such a system are shown in FIG. 14. As in the previous example, a PCIe device is mapped to a particular host. Three hosts are shown 1410, 1411, and 1412, along with a PCIe device 1420. In this example, the PCIe device 1420 has a BDF value of 0x300. The PCIe device 1420 is connected to a VIC adapter 1440, via a PCIe switch 1430. The interfaces for the hosts are shown as vNICs 1451, 1452, and 1453. Each shows a cartridge identifier and instance within the cartridge for its associated host. A computing system management module CSM 1480 is also shown in communication with the VIC adapter 1440 and the hosts' vNICs 1451, 1452, and 1453. The mapping of a PCIe device to a host, along with other operations of system 1400, is constrained in this example by one or more policies. A hot plug policy 1490 is shown here. The constraints imposed by such a policy may be implemented through the CSM 1480.

Figure 15:
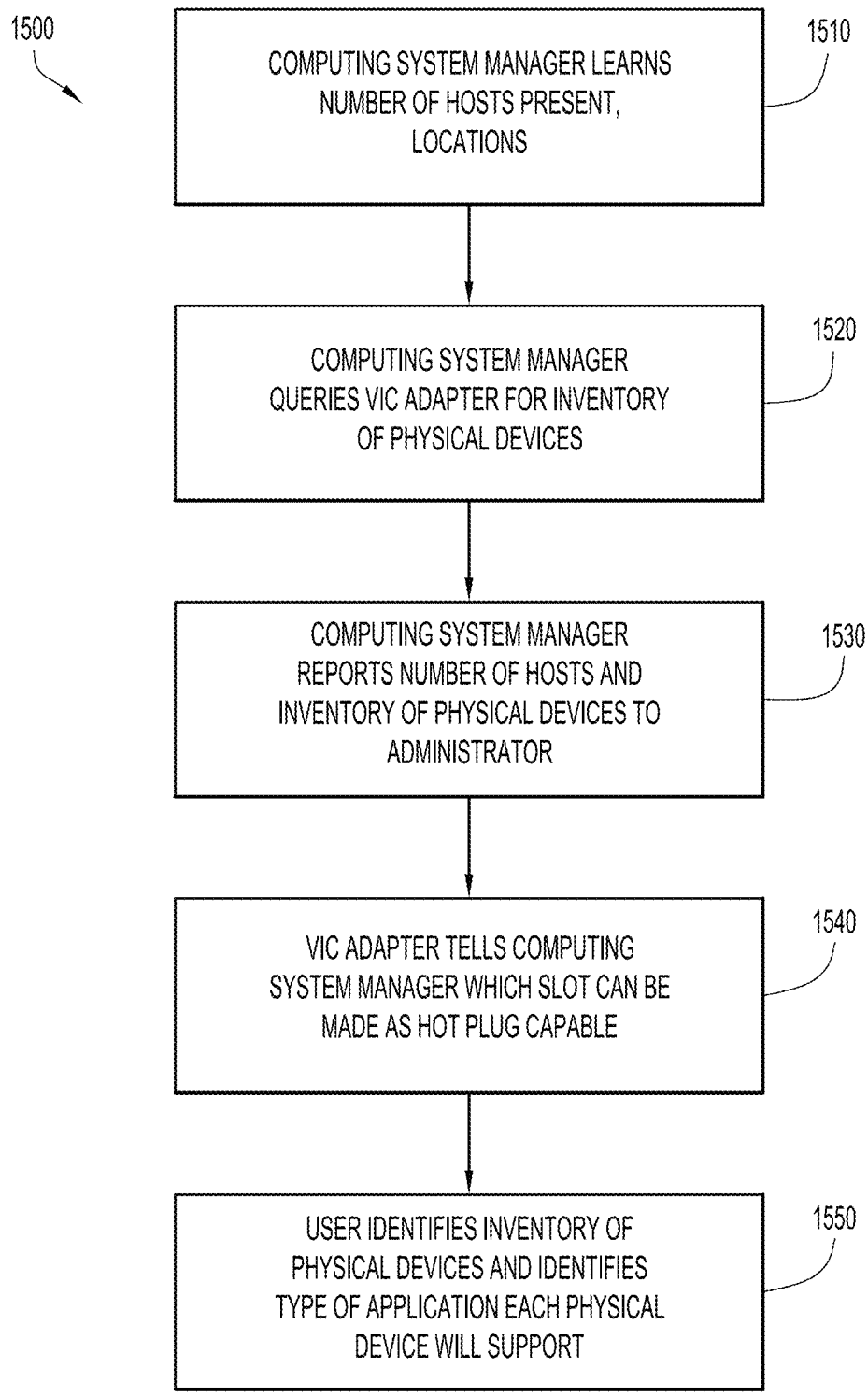
FIG. 15 is a flowchart illustrating a process for identification of components in the connection of a hot pluggable device to a set of hosts, in an example embodiment.

A process for determining the presence of hosts and PCIe devices is illustrated in FIG. 15, according to an embodiment. At 1510, the CSM learns the number of hosts present, along with their locations. As discussed above in the previous examples, this information is sent to the CSM by the BMC and/or the CMC. As in the cases above, the location of a host may include an identifier of a cartridge that holds the host, along with an identifier of the host within the cartridge. At 1520, the CSM queries the VIC adapter to obtain an inventory of physical devices attached to the VIC adapter. After the VIC adapter has learned of these devices and satisfied the query of the CSM, then at 1530 the CSM reports the number of hosts and the inventory of devices to the administrator. This may take place through a CLI or GUI. Moreover, the VIC adapter has at this point associated bus addresses to the BAR of each device, to allow access to register space. At 1540, the VIC adapter informs the CSM which of its slots can be treated as hot plug capable. At 1550, the user identifies the inventory of devices and what type of application each device will support.

In an embodiment, the VIC adapter also informs the OS of the selected host regarding the presence of the hot plug capable PCIe switch. The OS can also reserve bus address space and BDF values for additional devices.

Figure 16:
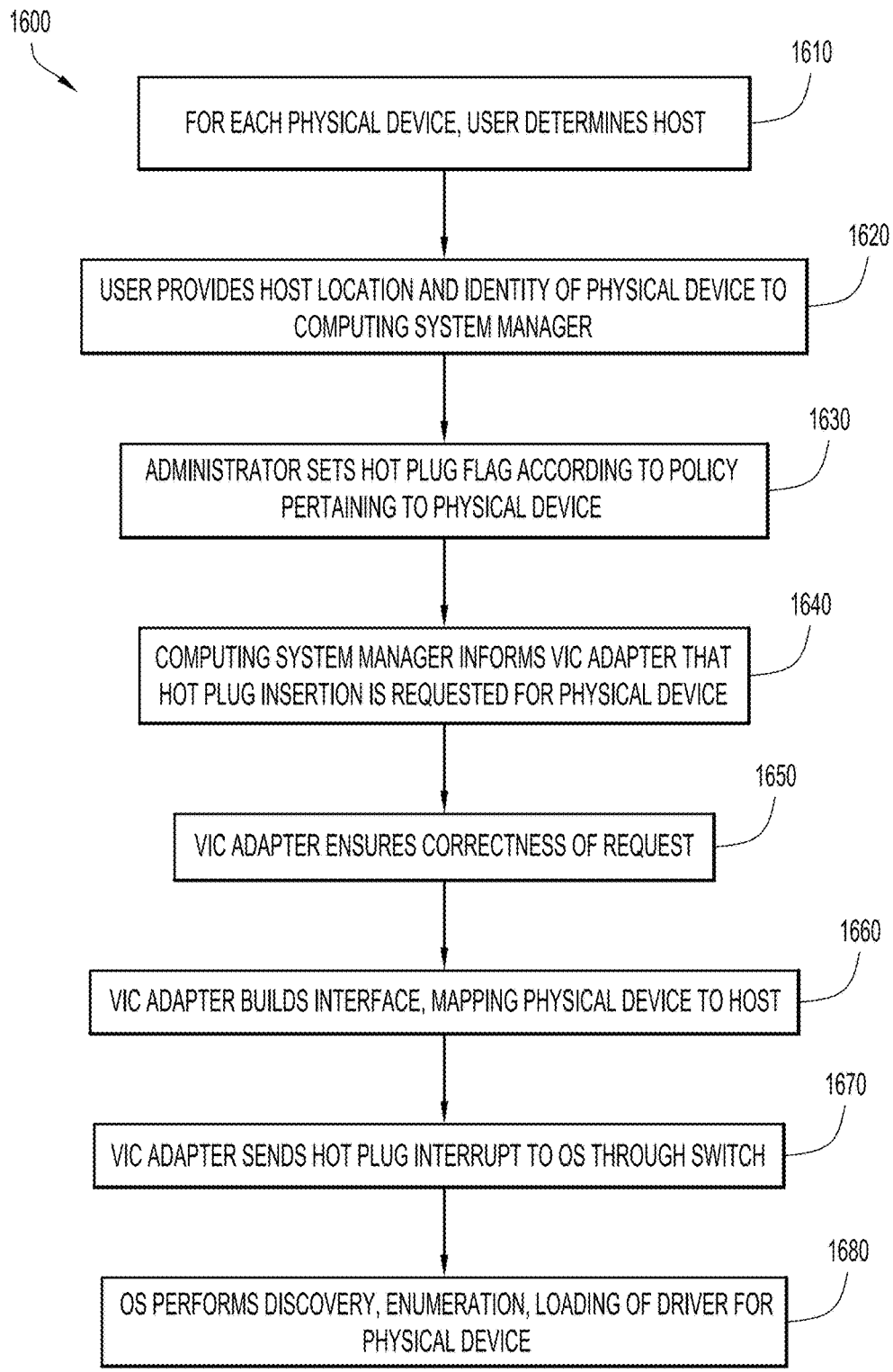
FIG. 16 is a flowchart illustrating a process for the mapping of components in the connection of a hot pluggable device to a set of hosts, in an example embodiment.

The mapping of a hot plug device to a host is illustrated in FIG. 16, according to an embodiment. At 1610, the user determines a host for each device. At 1620, the user provides the location of the selected host (e.g., a cartridge identifier and a host identifier within the cartridge) and the identity of the device to the CSM. At 1630, the administrator may set a hot plug flag. At 1640, the CSM informs the VIC adapter that hot plug insertion is requested for the device. At 1650, the VIC adapter ensures the correctness of the request. At 1660, the VIC adapter builds an interface mapping the device to the selected host. To do so, the VIC adapter configures the RNAXI registers and binds the device to the host's vNIC. At 1670, the VIC adapter sends a hot plug interrupt to the OS of the selected host. In the illustrated embodiment, this interrupt is sent via a hot plug capable virtual switch associated with the selected host. At 1680, the OS performs discovery, enumeration, and loading of a driver for the device. The driver will associate the BDF of the device and the BAR addresses in order to make the device functional.

Figure 17:
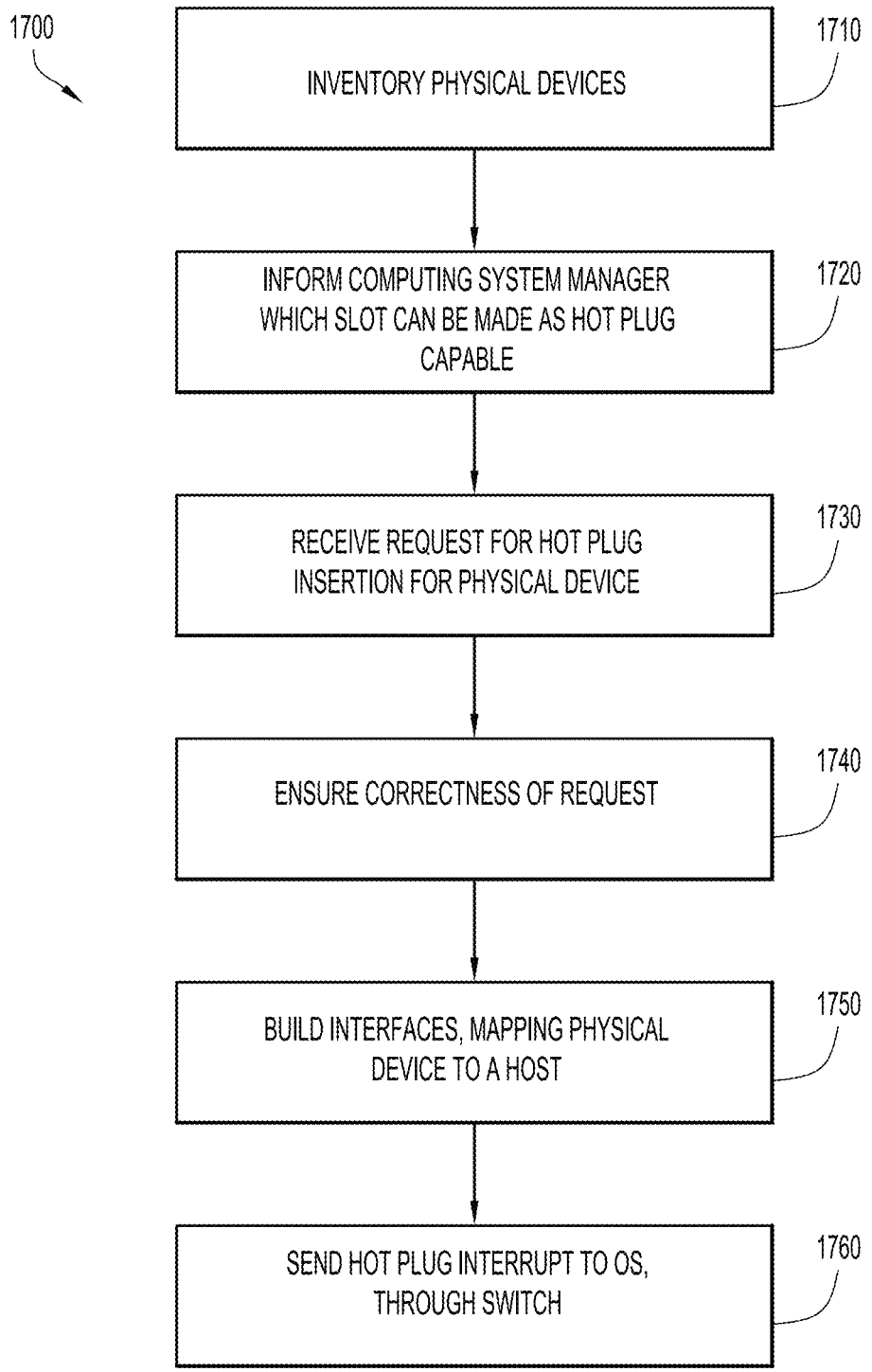
FIG. 17 is a flowchart illustrating a process for the identification and mapping of components in the connection of a hot pluggable device to a set of hosts from the perspective of a VIC adapter, in an example embodiment.

The process of identifying components and mapping a hot plug device to a host is illustrated in FIG. 17 from the perspective of the VIC adapter, according to an embodiment. At 1720, the VIC adapter inventories the physical devices attached to it. As noted above, such devices may be attached to the VIC adapter through a PCIe switch. At 1720, the VIC adapter informs the CSM which of its slots can be made as hot plug capable. At 1730, the VIC adapter receives a request for hot plug insertion for the device. At 1740, the VIC adapter ensures the correctness of the request. At 1750, the VIC adapter builds an interface that connects the device to the host. At 1760, the VIC adapter sends a hot plug interrupt to the OS of the host, via the hot plug capable virtual switch associated with the selected host.

Figure 18:
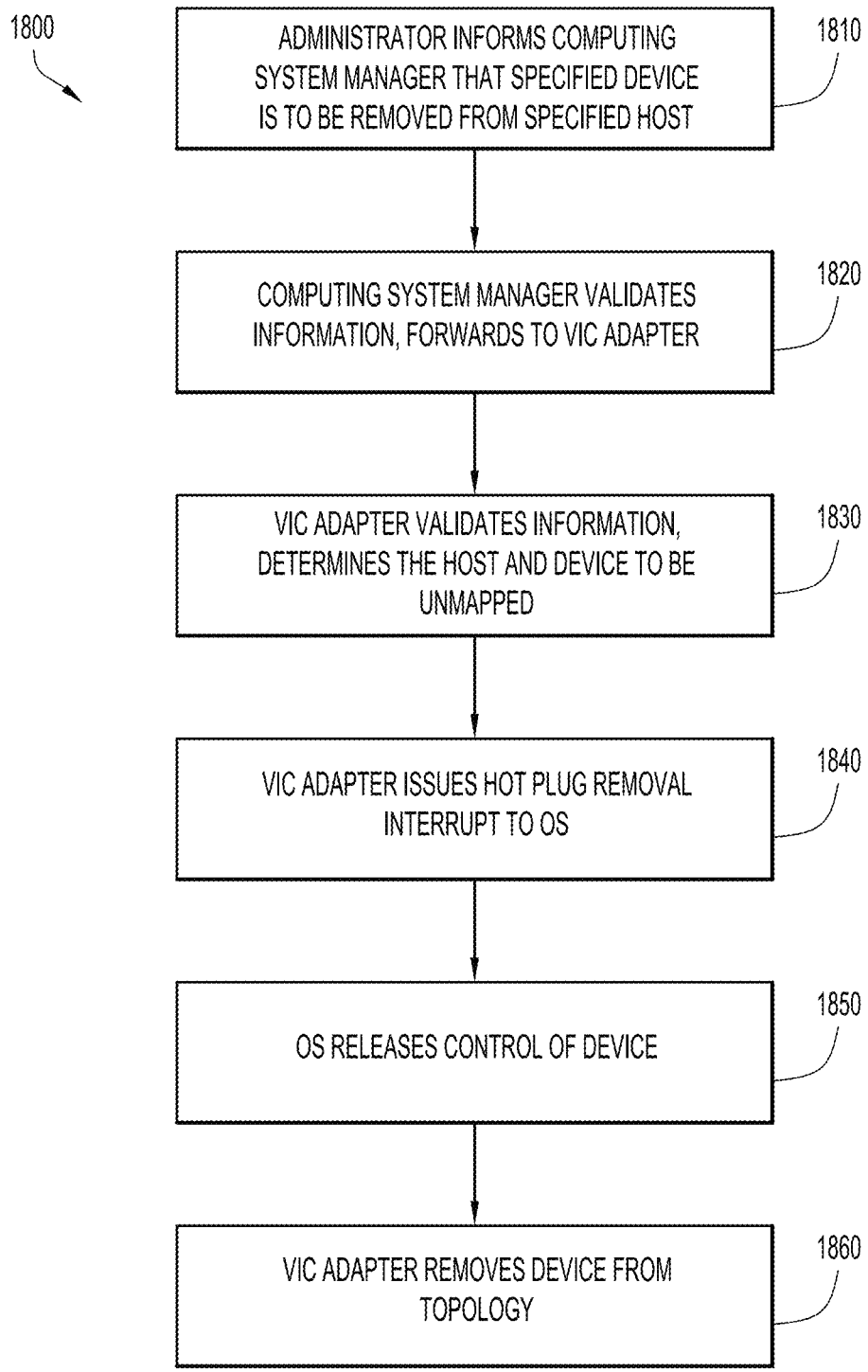
FIG. 18 is a flowchart illustrating a process for the detachment of a hot pluggable device from a set of hosts, in an example embodiment.

The process of hot plug detachment of a device from a host is illustrated in FIG. 18, according to an embodiment. At 1810, the administrator informs the CSM that the device is to be removed from the host. At 1820, the CSM validates the information and forwards the message to the VIC adapter as a removal request. At 1830, the VIC adapter validates the information and determines the host and device to be unmapped. At 1840, the VIC adapter issues a hot plug removal interrupt to the OS of the host, specifying the BDF of the device. At 1850, the OS releases control of the device. In an embodiment, this may entail the VIC adapter sending an attention interrupt to the OS, which implies that the device under the downstream port is about to be removed. The OS then issues a removal notice to the hot plug driver to take appropriate actions. The hot plug driver in the OS then stops IO and any in-progress transactions happening to the device. The hot plug driver then turns off the power to the downstream port. Once the VIC adapter receives the power off event for the slot (e.g., through hot plug registers inside the downstream port), the VIC adapter then removes the device from the topology at 1860.

Figure 19:
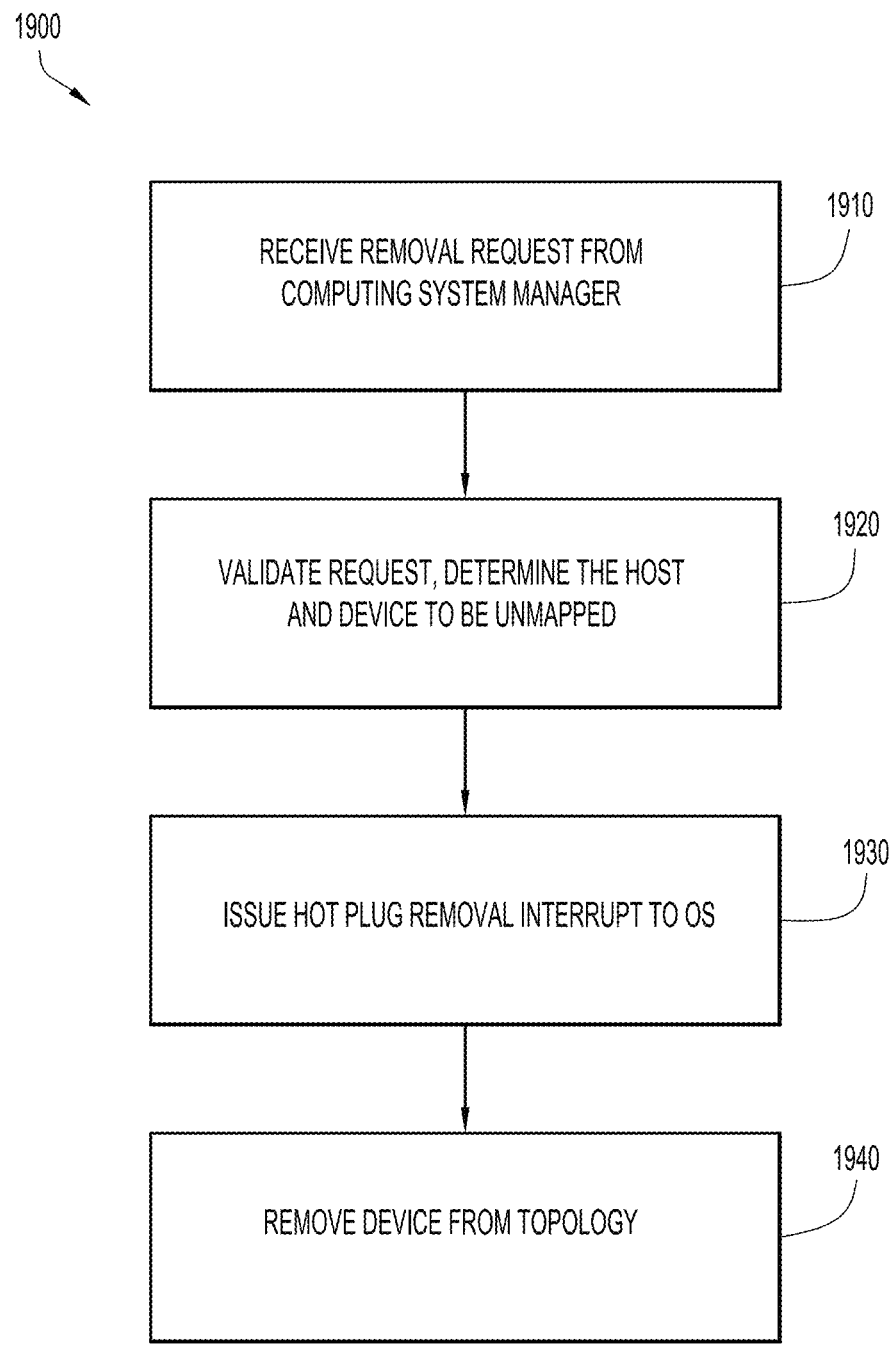
FIG. 19 is a flowchart illustrating a process for the detachment of a hot pluggable device from a set of hosts from the perspective of a VIC adapter, in an embodiment.

The process of detachment is illustrated in FIG. 19 from the perspective of the VIC adapter, according to an embodiment. At 1910, the VIC adapter receives the removal request from the CSM. At 1920, the request is validated and the VIC adapter determines the host and device to be unmapped. At 1930, the VIC adapter issues a hot plug removal interrupt to the OS of the host. At 1940, the device is removed from the system topology.

Figure 20:
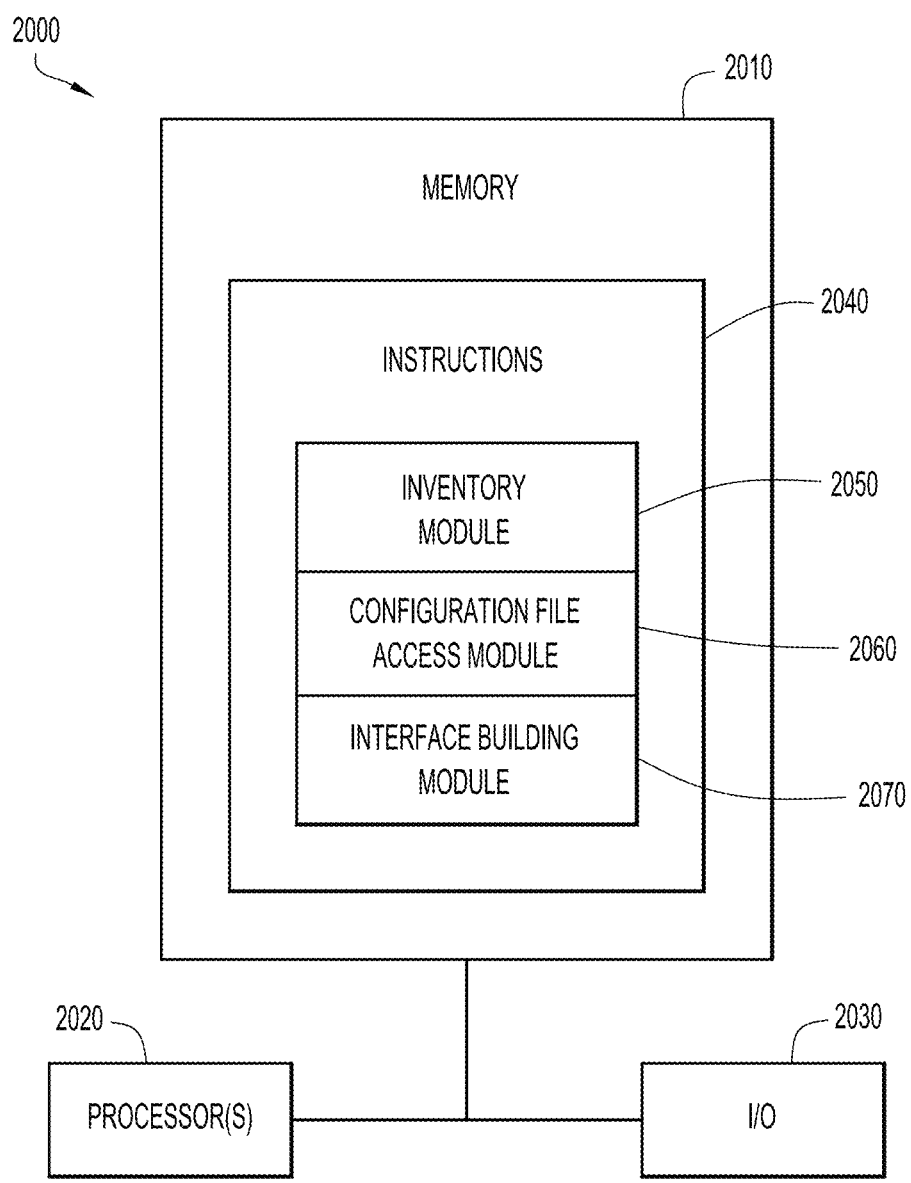
FIG. 20 is a block diagram of the computing architecture on a VIC adapter, in an example embodiment.

In an embodiment, the above processing is performed by software or firmware in the VIC adapter. A software or firmware embodiment is illustrated in FIG. 20. Computing system 2000 includes one or more memory devices, shown collectively as memory 2010. Memory 2010 is in communication with one or more programmable processors or controllers 2020 and input/output ports and devices shown collectively as I/O 2030. In one form, the I/O 2030 includes interfaces that enable communication with a PCIe switch, one or more PCIe devices, and host machines.

Memory 2010 may comprise read only memory (ROM), random access memory (RAM), magnetic disk storage media devices, optical storage media devices, flash memory devices, electrical, optical, or other physically tangible (i.e., non-transitory) memory storage devices. Memory 2010 stores data as well as executable instructions 2040. Instructions 2040 are executable on processor(s) 2020. The processor(s) 2020 comprise, for example, a microprocessor or microcontroller that executes instructions 2040. Thus, in general, the memory 2010 may comprise one or more tangible (non-transitory) computer readable storage media (e.g., memory device(s)) encoded with software or firmware that comprises computer executable instructions. When the software is executed (by the processor(s) 2020) the software or firmware is operable to perform the operations described herein.

In the illustrated embodiment, the executable instructions 2040 may include several modules. These include an inventory module 2050 configured to identify PCIe devices attached to the VIC adapter via a PCIe switch. Executable instructions 2040 may also include a configuration file access module 2060, configured to read and validate configuration files containing the identities of PCIe devices and host locations. Executable instructions 2040 may also include an interface building module 2060, configured to perform functions related to connecting a PCIe device or a virtual or physical function to a selected host The above description provides a method of connecting a device to one of a plurality of processing hosts, comprising learning the number and location of the hosts and an identification of the device; receiving a correspondence of the device to a selected host where in the host is selected from the plurality of hosts; and dynamically building an interface that connects the device to the selected host, wherein the learning, receiving, and building are performed by a VIC adapter.

In another form, an apparatus is provided for connecting a peripheral device to one of a plurality of processing hosts, comprising a memory; and a processor coupled to the memory and configured to execute instructions stored in the memory device, the processor configured to learn the number and location of the hosts and an identification of the device; receive a correspondence of the device to a selected host where in the host is selected from the plurality of hosts; and dynamically build an interface that connects the device to the selected host.

In another form, a computer readable non-transitory storage media is provided, where the storage media is encoded with computer-readable instructions that, when executed by a processor, cause the processor to learn the number and location of the hosts and an identification of the device; receive a correspondence of the device to a selected host where in the host is selected from the plurality of hosts; and dynamically build an interface that connects the device to the selected host, wherein the learning, receiving, and building are performed by a virtual interface card (VIC) adapter.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method of connecting a device to one of a plurality of processing hosts, comprising:
    at a virtual interface card (VIC) adapter:
        receiving, from a computing system manager (CSM) that is in communication with the plurality of processing hosts, a query for an inventory of the device;
        conducting the inventory;
        sending the inventory to the CSM;

receiving, from the CSM via one or more configuration files, a correspondence of the device to a selected host, wherein the selected host is selected from the plurality of processing hosts, and wherein the correspondence includes an identification of the device and a location of the selected host; and dynamically building an interface that connects the device to the selected host by translating an address in a base address register of a virtual network interface card of the selected host to an address of the device.

2. The method of claim 1, wherein the device and any additional devices are physically connected to the VIC adapter.

3. The method of claim 2, wherein the inventory is sent in response to the query from the CSM.

4. The method of claim 1, wherein the plurality of processing hosts are organized in a plurality of cartridges, where each cartridge contains one or more hosts, and wherein the learning of the location of the selected host comprises receiving an indication of the cartridge containing the selected host and the location of the selected host within the indicated cartridge.

5. The method of claim 1, wherein the plurality of processing hosts comprises one or more virtual hosts.

6. The method of claim 1, wherein the device is a Peripheral Component Interconnect Express (PCIe) device connected to a PCIe switch, which is in turn connected to the VIC adapter.

7. The method of claim 1, wherein the device is a Single Root Input Output Virtualization (SRIOV)-capable Peripheral Component Interconnect Express (PCIe) device connected to a PCIe switch, which is in turn connected to the VIC adapter.

8. The method of claim 7, further comprising preparing a virtual function space for virtual functions of the SRIOV-capable PCIe device.

9. The method of claim 7, wherein the receiving the correspondence comprises receiving the identification of the SRIOV-capable PCIe device, an identification of a virtual function in the SRIOV-capable PCIe device, and a location of the selected host that is to be mapped to the virtual function, from the CSM.

10. The method of claim 9, wherein the dynamically building the interface comprises dynamically building the interface to connect the virtual function and the selected host.

11. The method of claim 9, wherein the dynamically building the interface comprises enabling an SRIOV translation process that translates configuration space transactions of the virtual function to a configuration space of a related physical function.

12. The method of claim 1, wherein the device is a Peripheral Component Interconnect Express (PCIe) device in communication with a PCIe switch that is in communication with the VIC adapter, and further comprising:

identifying, to the CSM, a slot of the PCIe switch that is hot plug capable.

13. The method of claim 12, wherein the dynamically building the interface comprises receiving, from the CSM, a request for hot plug insertion for the device.

14. The method of claim 12, further comprising sending a hot plug interrupt to an operating system (OS) of the selected host, the hot plug interrupt causing the OS to perform discovery, enumeration, and loading of a driver for the device.

15. The method of claim 14, further comprising sending a hot plug removal interrupt to the OS, the hot plug interrupt causing the OS to release control of the device.

16. A virtual interface card (VIC) adapter for connecting a peripheral device to one of a plurality of processing hosts, comprising:

a memory comprising firmware; and a processor coupled to the memory and configured to execute instructions stored in the memory, the processor configured to:

receive, from a computing system manager (CSM) that is in communication with the plurality of processing hosts, a query for an inventory of the device;

conduct the inventory;

send the inventory to the CSM;

receive, from the CSM via one or more configuration files, a correspondence of the device to a selected host, wherein the selected host is selected from the plurality of processing hosts, and wherein the correspondence includes an identification of the device and a location of the selected host; and dynamically build an interface that connects the device to the selected host by translating an address in a base address register of a virtual network interface card of the selected host to an address of the device.

17. The VIC adapter of claim 16, wherein the device and any additional devices are physically connected to the VIC adapter.

18. The VIC adapter of claim 17, wherein the inventory is sent in response to the query from the CSM.

19. The VIC adapter of claim 16, wherein the plurality of processing hosts are organized in a plurality of cartridges, where each cartridge contains one or more hosts, and wherein the processor is configured to receive an indication of the cartridge containing the selected host and the location of the selected host within the indicated cartridge.

20. The VIC adapter of claim 16, wherein the plurality of processing hosts comprises one or more virtual hosts.

21. The VIC adapter of claim 16, wherein the device is a Peripheral Component Interconnect Express (PCIe) device connected to a PCIe switch, which is in turn connected to the apparatus.

22. The VIC adapter of claim 16, wherein the device is a Single Root Input Output Virtualization (SRIOV)-capable Peripheral Component Interconnect Express (PCIe) device connected to a PCIe switch, which is in turn connected to the apparatus.

23. The VIC adapter of claim 22, wherein the processor is further configured to prepare a virtual function space for virtual functions of the SRIOV-capable PCIe device.

24. The VIC adapter of claim 22, wherein the processor is configured to receive the correspondence by receiving the identification of the SRIOV-capable PCIe device, an identification of a virtual function in the SRIOV-capable PCIe device, and a location of the selected host that is to be mapped to the virtual function, from the CSM.

25. The VIC adapter of claim 24, wherein the processor is configured to dynamically build the interface by dynamically building the interface to connect the virtual function and the selected host.

26. The VIC adapter of claim 24, wherein the processor is configured to dynamically build the interface by enabling an SRIOV translation process that translates configuration space transactions of the virtual function to a configuration space of a related physical function.

27. The VIC adapter of claim 16, wherein the device is a Peripheral Component Interconnect Express (PCIe) device in communication with a PCIe switch that is in communication with the apparatus, and wherein the processor is further configured to identify, to the CSM, a slot of the PCIe switch that is hot plug capable.

28. The VIC adapter of claim 27, wherein the processor is configured to dynamically build the interface by receiving, from the CSM, a request for hot plug insertion for the device.

29. The VIC adapter of claim 27, wherein the processor is further configured to send a hot plug interrupt to an operating system (OS) of the selected host, the hot plug interrupt causing the OS to perform discovery, enumeration, and loading of a driver for the device.

30. The VIC adapter of claim 29, wherein the processor is further configured to send a hot plug removal interrupt to the OS, the hot plug interrupt causing the OS to release control of the device.

31. One or more computer readable non-transitory storage media encoded with computer-readable instructions that, when executed by a processor, cause a virtual interface card (VIC) adapter connecting a device to one of a plurality of processing hosts to:
  receive, from a computing system manager (CSM) that is in communication with the plurality of processing hosts, a query for an inventory of the device;
  conduct the inventory;
  send the inventory to the CSM;
  receive, from the CSM via one or more configuration files, a correspondence of the device to a selected host, wherein the selected host is selected from the plurality of processing hosts, and wherein the correspondence includes an identification of the device and a location of the selected host; and
  dynamically build an interface that connects the device to the selected host by translating an address in a base address register of a virtual network interface card of the selected host to an address of the device.

32. The computer readable storage media of claim 31, wherein the device and any additional devices are physically connected to the VIC adapter.

33. The computer readable storage media of claim 32, wherein the inventory is sent in response to the query from the CSM.

34. The computer readable storage media of claim 31, wherein the plurality of processing hosts are organized in a plurality of cartridges, where each cartridge contains one or more host, and wherein the instructions that cause the VIC adapter to receive the location of the selected host comprise instructions that, when executed by the processor, cause the VIC adapter to:
  receive an indication of the cartridge containing the selected host and the location of the selected host within the indicated cartridge.

35. The computer readable storage media of claim 31, wherein the plurality of processing hosts comprises one or more virtual hosts.

36. The computer readable storage media of claim 31, wherein the device is a Peripheral Component Interconnect Express (PCIe) device connected to a PCIe switch, which is in turn connected to the VIC adapter.

37. The computer readable storage media of claim 31, wherein the device is a Single Root Input Output Virtualization (SRIOV)-capable Peripheral Component Interconnect Express (PCIe) device connected to a PCIe switch, which is in turn connected to the VIC adapter.

38. The computer readable storage media of claim 37, further comprising computer-readable instructions that, when executed by a processor, cause the processor to:
  prepare a virtual function space for virtual functions of the SRIOV-capable PCIe device.

39. The computer readable storage media of claim 37, wherein the instructions that cause the VIC adapter to receive the correspondence comprise instructions that, when executed by the processor, cause the VIC adapter to:
  receive the identification of the SRIOV-capable PCIe device, an identification of a virtual function in the SRIOV-capable PCIe device, and a location of the selected host that is to be mapped to the virtual function, from the CSM.

40. The computer readable storage media of claim 39, wherein the instructions that cause the VIC adapter to dynamically build the interface comprise instructions that, when executed by the processor, cause the VIC adapter to:
  dynamically build the interface to connect the virtual function and the selected host.

41. The computer readable storage media of claim 39, wherein the instructions that cause the VIC adapter to dynamically build the interface comprise instructions that, when executed by the processor, cause the VIC adapter to:
  enable an SRIOV translation process that translates configuration space transactions of the virtual function to a configuration space of a related physical function.

42. The computer readable storage media of claim 31, wherein the device is a PCIe device in communication with a PCIe switch that is in communication with the VIC adapter, and wherein the instructions, when executed by the processor, further cause the VIC adapter to:
  identify, to the CSM, a slot of the PCIe switch that is hot plug capable.

43. The computer readable storage media of claim 42, wherein the instructions that cause the VIC adapter to dynamically build the interface comprise instructions that, when executed by the processor, cause the VIC adapter to:
  receive, from the CSM, a request for hot plug insertion for the device.

44. The computer readable storage media of claim 42, wherein the instructions, when executed by the processor, further cause the VIC adapter to:
  send a hot plug interrupt to an operating system (OS) of the selected host, the hot plug interrupt causing the OS to perform discovery, enumeration, and loading of a driver for the device.

45. The computer readable storage media of claim 44, wherein the instructions, when executed by the processor, further cause the VIC adapter to:
  send a hot plug removal interrupt to the OS, the hot plug removal interrupt causing the OS to release control of the device.

* * * * *